US011444896B1

(12) United States Patent
Kwon et al.

(10) Patent No.: US 11,444,896 B1
(45) Date of Patent: Sep. 13, 2022

(54) REAL-TIME FEEDBACK FOR MESSAGE COMPOSITION IN A COMMUNICATION PLATFORM

(71) Applicant: Slack Technologies, Inc., San Francisco, CA (US)

(72) Inventors: Ohjoong Kwon, Campbell, CA (US); Deani Hansen, Vancouver (CA)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/226,500

(22) Filed: Apr. 9, 2021

(51) Int. Cl.
  *H04L 51/06* (2022.01)
  *H04L 51/00* (2022.01)
  *H04L 51/52* (2022.01)

(52) U.S. Cl.
  CPC .............. *H04L 51/06* (2013.01); *H04L 51/14* (2013.01); *H04L 51/16* (2013.01); *H04L 51/32* (2013.01)

(58) Field of Classification Search
  CPC ......... H04L 51/06; H04L 51/14; H04L 51/16; H04L 51/32
  See application file for complete search history.

(56) References Cited

U.S. PATENT DOCUMENTS

| | | | | |
|---|---|---|---|---|
| 8,799,374 | B2 * | 8/2014 | Sharma | H04W 4/18 709/206 |
| 10,353,542 | B2 * | 7/2019 | Sinha | G06F 3/0482 |
| 10,594,757 | B1 * | 3/2020 | Shevchenko | G06F 40/186 |
| 10,796,384 | B2 * | 10/2020 | Sanio | H04L 51/32 |
| 10,924,447 | B2 * | 2/2021 | Kim | H04L 51/36 |
| 11,038,974 | B1 * | 6/2021 | Koukoumidis | G06K 9/6273 |
| 11,080,775 | B2 * | 8/2021 | Alkan | G06N 20/00 |
| 11,153,293 | B1 * | 10/2021 | Fan | H04L 63/102 |
| 11,310,189 | B1 * | 4/2022 | Kim | H04L 51/36 |
| 2011/0035455 | A1 * | 2/2011 | Sharma | G06Q 30/0207 709/206 |
| 2013/0051326 | A1 * | 2/2013 | Jeyatharan | H04L 47/824 370/328 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Sargon N Nano
(74) *Attorney, Agent, or Firm* — Lee & Hayes, P.C.

(57) ABSTRACT

Utilizing real-time feedback for message composition in a communication platform is described. Server(s) associated with a group-based communication platform can receive, from a client of a user associated with the group-based communication platform, a request to generate a new message and based at least in part on a determination of a recipient of the new message and communication data associated with the group-based communication platform or the recipient, can generate a recommendation associated with an aspect of the new message to optimize the new message for the recipient. In an example, the server(s) can cause a user interface element associated with the recommendation to be presented via a group-based communication user interface of the group-based communication platform in association with the new message.

19 Claims, 15 Drawing Sheets

(56) References Cited

U.S. PATENT DOCUMENTS

| | | | | |
|---|---|---|---|---|
| 2014/0036733 | A1* | 2/2014 | Teng | G06Q 10/109 370/260 |
| 2015/0347556 | A1* | 12/2015 | Sanio | G06Q 50/01 707/737 |
| 2016/0073422 | A1* | 3/2016 | Pajukoski | H04W 72/0406 370/329 |
| 2017/0214701 | A1* | 7/2017 | Hasan | H04L 63/145 |
| 2018/0287982 | A1 | 10/2018 | Draeger et al. | |
| 2018/0300305 | A1* | 10/2018 | Lam | G06F 40/186 |
| 2019/0158443 | A1* | 5/2019 | Liao | H04L 41/0896 |
| 2019/0266185 | A1* | 8/2019 | Rao | H04N 21/4758 |
| 2019/0349402 | A1* | 11/2019 | Shukla | H04L 9/0838 |
| 2020/0097544 | A1* | 3/2020 | Alexander | G06N 3/084 |
| 2020/0412771 | A1* | 12/2020 | Schemers | H04L 65/1096 |
| 2021/0073336 | A1* | 3/2021 | Fox | G06N 3/0454 |

OTHER PUBLICATIONS

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

U.S. Appl. No. 16/875,933, filed May 15, 2020, Oliner, et al., "Embeddings-Based Discovery and Exposure of Communication Platform Features", 54 pages.

U.S. Appl. No. 16/993,859, filed Aug. 14, 2020, Butterfield, et al., "Electronic Board Associated With a Communication Platform", 45 pages.

* cited by examiner

REAL-TIME FEEDBACK FOR MESSAGE COMPOSITION IN A COMMUNICATION PLATFORM

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices, allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating messages posted to and/or actions taken with respect to a particular channel, direct message, and/or other virtual space.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
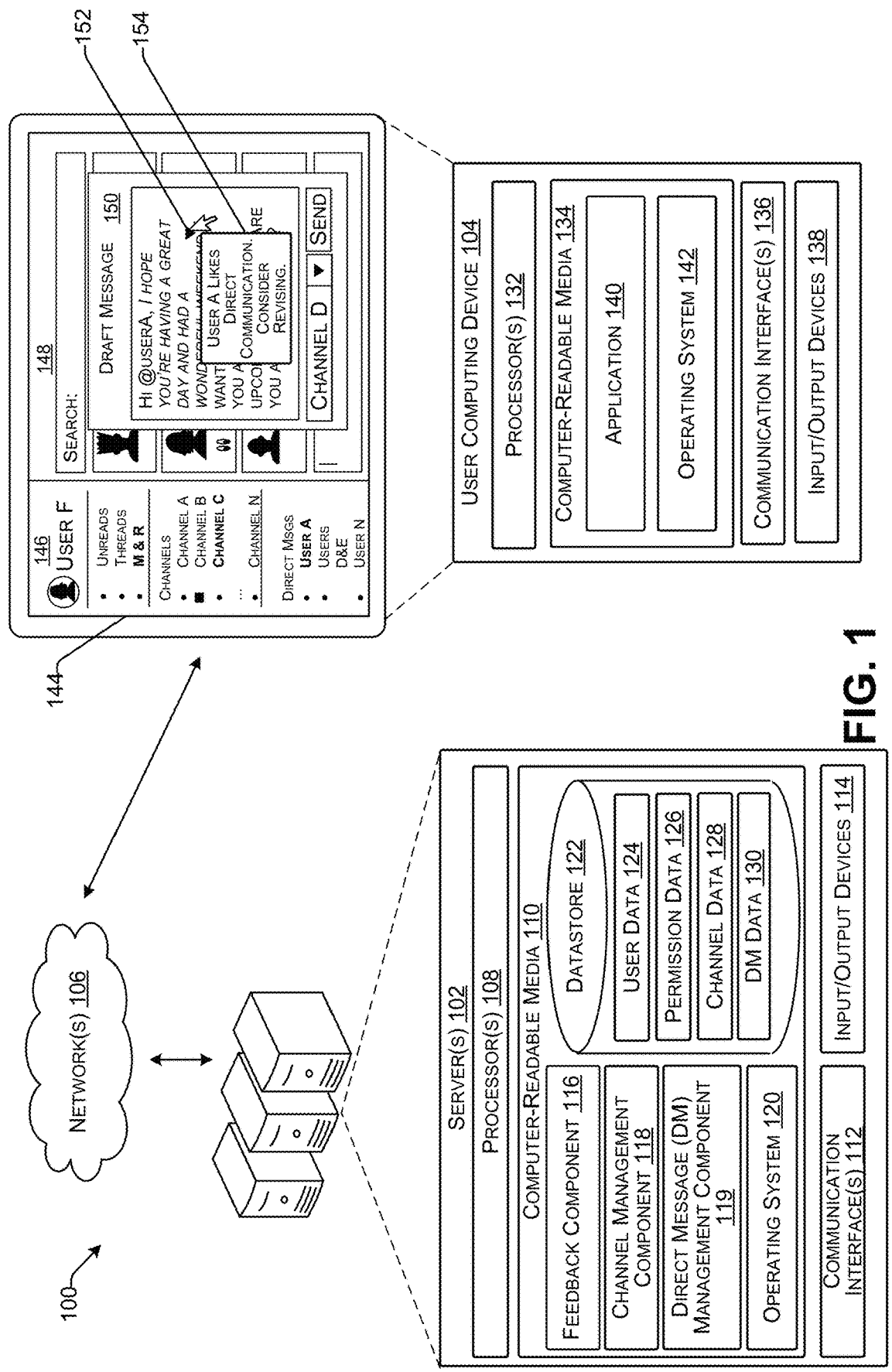
FIG. 1 illustrates an example environment for performing techniques described herein.

Messages exchanged via a communication platform can be customized and/or personalized based on real-time feedback presented via a user interface of the communication platform in association with message composition. A communication platform, which, in some examples can be a group-based communication platform, a channel-based communication platform, a permission-based communication platform, a channel-based messaging platform, and/or any other platform for facilitating communication between and among users, can enable users to exchange messages via the communication platform. In some examples, the communication platform can analyze messages previously exchanged via the communication platform and/or additional or alternative data associated with senders, recipients, messages, and/or the like to generate recommendations for optimizing messages in association with message composition. In some examples, such recommendations can be presented via a user interface of the communication platform in real-time as users are composing messages. In some examples, such recommendations can be presented via the user interface after messages are composed but before such messages are sent and/or otherwise posted to a channel, direct message, and/or other virtual space.

For purposes of this discussion, a "message" can refer to any electronically generated digital object, provided by a user using a user computing device associated with the communication platform, that is configured for display within a channel, direct message, and/or other virtual space of the communication platform for facilitating communications as described herein. A message may include any text, image, video, audio, or combination thereof provided by a user (using a user computing device). For instance, the user may provide a message that includes text, as well as an image and/or a video, within the message as message contents and/or otherwise associated with the message (e.g., as an attachment or link). In such an example, the text and image and/or video can comprise the message. In some examples, messages can be associated with one or more files or other attachments, emojis, reactjis, and/or the like. In some examples, messages can include or be associated with one or more links to content stored by the communication platform or a third-party platform or service. Each message can include metadata comprising a sending user identifier (e.g., identifying a sender or originator of the message), a recipient identifier (e.g., identifying a user and/or entity that is intended to receive the message), a message identifier (e.g., identifying the message itself), a group identifier (e.g., identifying a group associated with the sender and/or message), a channel identifier (e.g., identifying a channel associated with the message and/or the recipient), a direct message identifier (e.g., identifying a direct message associated with the message and/or the recipient), a virtual space identifier (e.g., identifying a virtual space associated with the message and/or the recipient), and/or the like. In at least one example, each of the foregoing identifiers may comprise American Standard Code for Information Interchange (ASCII) text, a pointer, a memory address, or the like. In some examples, message metadata can include message content in addition to the one or more identifiers listed above.

In at least one example, the communication platform can utilize communication data (e.g., previously exchanged messages and/or other interactions of users associated with the communication platform, emails, text messages, editing data, social media interactions, and/or the like) to train one or more models for providing real-time feedback during and/or otherwise associated with message composition. Such model(s) can be trained via machine learning mechanism(s) and can therefore comprise machine-trained model(s). In at least one example, such machine-trained model(s) can be utilized in association with composition of new messages. In at least one example, the machine-trained model(s) can output recommendations for optimizing or otherwise changing, revising, or updating new messages and/or aspects thereof. In some examples, messages can be optimized for a recipient, for a channel, for a direct message, for a virtual space, for a message type (e.g., a channel message, a direct message, an announcement, a private message, a public message, etc.), etc. In some examples, optimization can relate to whether to include or exclude a particular word and/or phrase, word choice, whether to include or exclude an emoji and/or reactji, a particular emoji and/or reactji to include or exclude, message format (e.g., text, video, image, audio, combination of formats, etc.), etc. In some examples, optimization can relate to tone or sentiment (e.g., the way a person speaks to someone), which can be different for different languages and/or cultures. In some examples, optimization can relate to a date to post a message, a time to post the message, a channel for posting the message, a type of channel for posting the message, a direct message for posting the message, a board for posting the message, and/or the like. In some examples, optimization can relate to grammar, spelling, and/or the like. Optimization of a message can therefore refer to making the message as effective as possible for the intended recipient(s). In some examples, as described above, techniques described herein can recommend changes, revisions, or other updates to messages and/or aspects associated therewith.

As an example, a user can compose a message via a composition user interface. In at least one example, a recipient of the message can be identified, for example based on a reference to the recipient, a virtual space with which the message is associated, or the like. In at least one example, the communication platform can analyze the message, in view of the recipient, and can make recommendations for modifying the content of the message, the type of message, the virtual space wherein the new message is to be posted, and/or the like. In some examples, such recommendations can be presented via the composition user interface in real-time, for example, as the user composes the message (e.g., as the user types, speaks, or otherwise provides input). In some examples, such recommendations can be presented via the composition user interface after the message is composed but prior to the message being posted to a channel, direct message, or other virtual space. In some examples, recommendations can be presented after a message has been sent (e.g., enabling the user to edit the message after the fact). In some examples, recommendations can be presented automatically or in response to a trigger event (e.g., actuation of a send or post actuation mechanism, actuation of an edit actuation mechanism, and/or the like). In some examples, if the user accepts a recommendation, or a portion thereof, the communication platform can effectuate a modification to the message automatically (i.e., without the user needing to further interact with the composition user interface). In some examples, the user can effectuate a modification manually (e.g., via an interaction with the composition user interface). Recommendations, as described herein, can optimize the message for the recipient in an effort to ensure the message is well received by the recipient and/or otherwise change, revise, or update the message.

In some examples, a recipient may not be identified by the user. For example, the user can generate a draft of a message without first identifying a recipient. In some examples, techniques described herein can recommend a recipient and/or a virtual space for posting the message. As an example, the communication platform can analyze the message and can make a recommendation to post the message in multiple channels, as an announcement, or via a direct message. In some examples, a recommendation can relate to a format of a message, such as a text message, an audio/video message, a document (e.g., instead of a message), etc. In some examples, such recommendations can optimize the message so that it is received by an appropriate audience.

Optimizations, as described herein, can improve communications between users of the communication platform. For example, by utilizing real-time feedback for optimizing messages, users can gain insights on communicating with fellow team members or other members of their organization (or other organizations). Such insights can enable the personalization and/or customization of messages. In some examples, such personalization and/or customization can provide efficiencies for the communication platform. For example, by composing a message that is personalized and/or customized for the recipient, fewer messages may be exchanged via the communication platform, thereby reducing bandwidth and network congestion, thereby improving user experience of the communication platform.

Furthermore, as described herein, in some examples, the communication platform can analyze a new message during composition and can determine that the new message references an object or topic. In some examples, such an object or topic can be referenced elsewhere on the communication platform (e.g., another message earlier in a channel, a different channel, a direct message, a board, etc.) and/or can be the subject of communication elsewhere on the communication platform. In some examples, the communication platform can identify the reference to the object or topic and can send a recommendation to a user computing device associated with a user drafting the new message that can reference the other object or topic. For example, if a user is composing a message related to a particular question that has already been asked and answered, the communication platform can send a recommendation to the user computing device that directs the user to the message, channel, etc. where the question has already been asked and answered. As another example, if a user is composing a message that includes a reference to a file that other users are conversing about, the communication platform can send a recommendation to the user computing device that directs the user to the conversation associated with the other users. In some examples, the user can opt to join in or participate in an already existing conversation about the object or topic (e.g., elsewhere on the communication platform). As such, techniques described herein can enable conservation of resources such that the user need not generate a new message that references an object or topic and instead, responsive to the real-time feedback, can refer to a previous conversation, and/or join an existing conversation about the object or topic.

In at least one example, by providing feedback in real-time, users can utilize the feedback to modify messages prior to messages being posted to the communication platform. This can reduce the need for users to edit or otherwise modify messages after messages are posted to the communication platform. That is, by providing real-time feedback, the communication platform can improve user interaction with the communication platform by reducing the number of interactions between users and user interfaces associated with the communication platform. Furthermore, in some examples, techniques described herein can utilize data associated with virtual spaces where messages are to be posted to alert or notify posting users of potential risks associated with posting such messages. As an example, if a message is intended to be posted in a channel associated with legal conversations and/or another organization, a recommendation can be presented to alert the posting user of such. In some examples, a recommendation can recommend a modification to a message to be posted in such a channel (e.g., a legal channel and/or an externally shared channel) to mitigate risk or otherwise optimize the message for the intended recipient(s). Such recommendations can further improve user interaction with the communication platform by increasing security and mitigating the posting of erroneous or inappropriate messages in various virtual spaces.

In addition to the technical improvements described above, techniques described herein can provide a variety of other improvements to communication platforms as well. As an example, techniques described herein can enable new hires or users starting new roles, with new teams, and/or new organizations to gain instant insight into other users of the communication platform. In a fully remote or hybrid (part remote, part in-person) work environment, such insights can be invaluable to developing rapport and easing transitions. In some examples, techniques described herein can provide organizations working together (e.g., via externally shared channels) insights about one another to foster more collegial and cooperative working relationships. Further, in some examples, techniques described herein can help users, teams, and/or organizations engage in inclusive conversations. That is, techniques described herein can provide insights so that users can personalize or customize messages for other users who have differing abilities and/or identities (e.g., cultural, gender, etc.). For example, a recommendation associated with a message can recommend that a sending user update language in the message to include preferred pronouns of a recipient that may not be known to the sender of the message. This can foster a more inclusive communication platform that enables users to feel a better sense of belonging.

Additional or alternative improvements to those described above are described below with reference to the figures. Furthermore, to the extent techniques described herein relate to recommendations for optimizing, changing, revising, or otherwise editing messages exchanged via the communication platform, techniques described herein can be similarly applicable to other types of messages or communications such as emails, text messages, social media posts, documents, and/or the like. In some such examples, additional or alternative data can be used to train machine-trained models as described herein.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such as a defined group of users having, for instance, sole access to a given communication channel. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces.

In at least one example, the server(s) 102 can communicate with a user computing device 104 via one or more network(s) 106. That is, the server(s) 102 and the user computing device 104 can transmit, receive, and/or store data (e.g., content, messages, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a feedback component 116, a channel management component 118, a direct message management component 119, an operating system 120, and a datastore 122.

In at least one example, the feedback component 116 can provide real-time feedback to users of the computing platform in association with message composition. In at least one example, the feedback component 116 can utilize context data, which can include messages previously exchanged between users (e.g., of the communication platform or other communication platforms), comments, responses, reactions (e.g., emojis, reactjis, etc.), etc., associated therewith (e.g., with individual messages and/or threaded conversations associated with the messages), documents, and/or the like to determine recommendations that can be output as real-time feedback. In some examples, the communication platform can train model(s) using machine learning mechanism(s), wherein resulting machine-trained models can be used for generating recommendations and/or the like. In some examples, as described in more detail below, communication data associated with users of the communication platform can be used as training data for the model(s). In some examples, such communication data can comprise messages and/or other interactions associated with users of the communication platform. In some examples, such communication data can include emails, text messages, social media messages, comments and/or edits to documents or other resources that are shared and/or not shared, and/or the like. In some examples, such communication data can be associated with the communication platform or third-party platforms or services. In some examples, user data, which can include preferences (e.g., explicitly or implicitly determined), classifications of users (e.g., personality or strengths), roles and/or positions of users (e.g., based on an organization chart, learned, etc.), etc., can be used as training data for the model(s). In some examples, data associated with messages such as a message type (e.g., a channel message, a direct message, an announcement, a private message, a public message, etc.), a format of a message (e.g., text format, video format, combination of format(s), etc.), and/or the like can be used as training data for the model(s). In some examples, data associated with virtual spaces to which messages are posted (e.g., a public channel, a private channel, an announcement channel, a shared channel, a channel of a particular topic, a direct message virtual space, a board, etc.) can be used as training data for training the model(s). In some examples, machine-trained model(s) can be trained on subsets of the messages and/or other interactions associated with the users of the communication platform such that the machine-trained model(s) can be particular to a user, similar users (e.g., users associated with similarity metrics that are within a threshold), a group of users (e.g., a workspace, an organization), a virtual space (e.g., a channel, a direct message, etc.), etc.

In some examples, the machine-trained model(s) can output recommendations with respect to aspect(s) of messages. That is, in at least one example, the feedback component 116 can analyze input associated with a new message using the machine-trained model(s) and, in some examples, can generate recommendations associated with aspect(s) of the new message. In some examples, the feedback component 116 can output recommendations regarding aspects of messages for optimization, as described above. In some examples, an aspect can be a virtual space with which the new message is to be posted, wherein the virtual space comprises a channel, a direct message, or a board. In some examples, the virtual space can comprise a document or document storage (e.g., instead of a channel, direct message, board, etc.). In some examples, an aspect of the new message can comprise a tone or sentiment of the new message. In some examples, an aspect of the new message can comprise an indication whether to include (or not include) an emoji, a reactji, an image, a video, a word, and/or a phrase. In some examples, if an emoji, a reactji, an image, a video, a word, and/or a phrase is recommended, the recommendation can include a particular emoji, reactji, image, video, word, and/or phrase (or another recommendation can be generated which includes an indication of the particular emoji, reactji, image, video, word, and/or phrase). In some examples, an aspect of the new message can comprise a format, such as a text message, a video message, etc. In some examples, an aspect can comprise a time for posting a message, a date for posting a message, or the like.

In some examples, the feedback component 116 can output a score or other indicator associated with a particular quality. Such qualities can include inclusivity, gender neutrality, political correctness, political neutrality, hyperbole, tone, sentiment, relevance, etc. In some examples, the communication platform can train model(s) to output scores or other indicators representative of how well messages comply with such qualities. In some examples, the communication platform can train model(s) using machine learning mechanism(s). In some examples, as described in more detail below, communication data, which can include messages and/or other interactions associated with users of the communication platform, and which, in some examples, can be labeled with scores, can be used as training data for the model(s). In some examples, machine-trained model(s) can be trained on subsets of the messages and/or other interactions associated with the users of the communication platform such that the machine-trained model(s) can be particular to a user, similar users (e.g., users associated with similarity metrics that are within a threshold), a group of users (e.g., a workspace, an organization), a virtual space (e.g., a channel, a direct message, etc.), etc.

In some examples, scores or other indicators can be output in association with recommendations and/or can be used to generate recommendations. For example, based at least in part on a political correctness score being below a threshold, the feedback component 116 can generate a recommendation to include or exclude a particular word or phrase to improve the political correctness score. Or, in at least one example, the political correctness score can be output in association with a message to inform the sender of the political correctness score. In some examples, administrators or other users can set thresholds for individual scores or other indicators that can limit which messages are posted to a channel, direct message, board, etc. For example, an administrator can indicate that a message with a political correctness score that is below a threshold may not be posted to an announcement channel. Or, as another example, an administrator can indicate that a message with an inclusivity score that is below a threshold cannot be posted to a job posting channel.

In some examples, the feedback component 116 can output recommendations that refer to another channel, direct message, board, thread, and/or the like wherein an object or topic referenced in the new message has been referenced or is being referenced elsewhere on the communication platform. In some examples, the feedback component 116 can analyze input received via a composition user interface and can determine that such input is associated with an object or a topic. In some examples, the feedback component 116 can utilize natural language processing, text recognition, image recognition, and/or the like to detect references to objects and/or topics. The feedback component 116 can analyze data associated with the communication platform to identify whether there are other references to the object or the topic. In at least one example, based at least in part on identifying another reference to the object or the topic, the feedback component 116 can output a recommendation that the user composing the message access the other reference before posting the message. In some examples, the user can opt to post a message in association with the other reference instead of posting the message being composed via the composition user interface.

In some examples, the feedback component 116 can output recommendations that provide context to a user composing a message. In such examples, such recommendations can be based at least in part on an intended recipient and/or an intended virtual space to which the message is to be posted. As an example, if a message is to be posted in a channel associated with another organization, the feedback component 116 can output a recommendation that provides an indication that the channel is associated with another organization. In some examples, the feedback component 116 can analyze the message contents to identify words, phrases, and/or other contents of the message that may not be appropriate for sharing with the other organization. In some examples, the feedback component 116 can utilize natural language processing, text recognition, image recognition, and/or the like to detect references to such words, phrases, and/or other contents. In some examples, a recommendation can recommend a modification or replacement of particular words, phrases, and/or other contents prior to posting to the channel that is associated with another organization. In another example, if a message is to be posted in a channel associated with a particular topic (e.g., "help desk"), the feedback component 116 can output a recommendation that provides an indication that the channel is associated with such a topic. In some examples, the feedback component 116 can analyze the message contents to identify words, phrases, and/or other contents of the message (e.g., using natural language processing, text recognition, image recognition, and/or the like) that may not be appropriate for sharing in a channel associated with such a topic. In such examples, the recommendation can include a recommendation to modify or replace such words, phrases, and/or other contents prior to posting to the channel. Such recommendations can be based at least in part on data associated with such intended recipient(s) and/or virtual space(s), such as descriptions, topics, titles/names, members, and/or the like.

In some examples, the feedback component 116 can output recommendations while the user is composing content of the message. That is, in some examples, the feedback component 116 can output recommendations in real-time or substantially real-time. In some examples, recommendations can be presented as in-line annotations. In some examples, recommendations can be presented as pop-ups, overlays, and/or the like. In some examples, recommendations can be presented automatically (e.g., without input from a user) or in response to actuation of actuation mechanisms associated with recommendations. In some examples, the feedback component 116 can output recommendations after a message has been generated but prior to posting the message in a channel, direct message, board, etc. In some examples, such a recommendation can be a modified draft of the message with all recommendations for optimization included. In some examples, such a recommendation can include multiple recommendations in a list or other configuration wherein a user can select which recommendations to implement. In some examples, recommendations can be in real-time in the sense that such recommendations are output within a threshold period of time from when composition of the message started and/or ended. In some examples, recommendations can be output after a message has been sent (e.g., prompting a user to edit the message), in response to an event, and/or the like. Additional details are provided below.

For the purpose of this discussion, a recommendation can be "output" by the feedback component 116 such that an indication of a recommendation generated by the feedback component 116 can be sent to the application 140. The application 140 can output the recommendation via a user interface. In some examples, the application 140 can render a user interface element associated with the recommendation via a user interface (e.g., a graphical user interface) associated with the communication platform. In some examples, the application 140 can cause the recommendation to be output via a speaker or other user interface. In some examples, recommendations can be associated with actions that can be performed by the communication platform, in response to user input or automatically. In some examples, recommendations can be associated with prompts for users to perform particular actions. Additional details are provided below.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform, such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" refers to a channel which is accessible across different organizations, whereas an "internal channel" refers to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like.

In some examples, the user data 124 can store indications of user preferences, which can be explicitly indicated or learned. In some examples, the user data 124 can store data received from third-party platforms. For instance, the user data 124 can store indications of classifications (e.g., Myers-Briggs®, CliftonStrengths®, etc.), some of which can be received from third-party platforms. In some examples, third-party data can be provided via application programming interface(s) (API(s)) or other mechanisms that enable integration of the third-party platform and the communication platform. In some examples, the communication platform can determine classifications based on its own models or mechanisms (e.g., based at least in part on previous messages and/or interactions between the user and the communication platform). In some examples, the user data 124 of a user can indicate a role or position of a user, which can be determined based at least in part on an organizational chart and/or learned. In some examples, the communication platform can store indications of which users and/or virtual spaces a user communicates with and/or in, a frequency of such communication, topics associated with such communications, reactions and/or feedback associated with such communications and/or the like. In some examples, such data (e.g., preferences of users, classifications of users, indications of which users and/or virtual spaces user communicate with and/or in, etc.) can be determined based at least in part on analyzing previous messages and/or other interactions between users of the communication platform. In some examples, such data can be determined based at least in part on embeddings associated with such messages. Additional details associated with embeddings and how such embeddings can be used is provided in U.S. patent application Ser. No. 16/875,933, filed on May 15, 2020, the entire contents of which are incorporated by reference herein.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored.

Messages posted, or otherwise sent and/or received, via channels, direct messages, etc. can be stored in associated with the channel data 128 and/or DM data 130. In some examples, such messages can additionally or alternatively be stored in association with the user data 124.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s) (e.g., trained as described herein), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated. Additional details associated with the first section 146 and user interface element(s) are described below with reference to FIG. 2A.

In at least one example, the user interface 144 can include a second section 148 (e.g., which can be a portion, pane, or other partitioned unit of the user interface 144) that can be associated with a data feed (or, "feed") indicating messages posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2A.

In at least one example, a composition user interface 150 can be presented via the user interface 144. The composition user interface 150 can provide an input mechanism to enable a user to generate a message. In some examples, the composition user interface 150 can be presented via a pop-up, overlay, modal, new section of the user interface 144, a new user interface, and/or the like. In some examples, users can generate a message via a composition user interface integrated into the first section 146 or the second section 148 of the user interface 144. In some examples, the composition user interface 150 can be configured for text input (e.g., via a keyboard or touchscreen), spoken input (e.g., via a microphone), an audio/visual input (e.g., via a camera), a combination of the foregoing, and/or the like. In some examples, the composition user interface 150 can include a mechanism for attaching or embedding objects and/or references to objects, such as images, files, and/or the like. In some examples, the composition user interface 150 can include a mechanism for associating emojis, reactjis, images, videos, etc. with messages.

In some examples, recommendations, as generated by the feedback component 116, can be presented via the composition user interface 150. In some examples, the feedback component 116 can cause a message being composed to be annotated with one or more user interface elements, such as the user interface element 152, indicating a recommendation is available for the message or a portion thereof. In some examples, the one or more user interface elements can be associated with actuation mechanisms such that, in response to detecting actuation of an actuation mechanism associated with a user interface element, a user interface element associated with a corresponding recommendation can be presented via the composition user interface 150. For example, based at least in part on detecting actuation of the user interface element 152, the feedback component 116, via the application 140, can cause a user interface element 154, associated with the recommendation, to be presented via the composition user interface 150. Additional details associated with the composition user interface 150 and/or recommendations presented thereby are described below with reference to FIGS. 2A-8.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the feedback component 116, the channel management component 118, the direct message management component 119, and the application 140, techniques described herein can be performed by any other component, or combination of components, which can be associated with the server(s) 102, the user computing device 104, or a combination thereof.

Figure 2A:
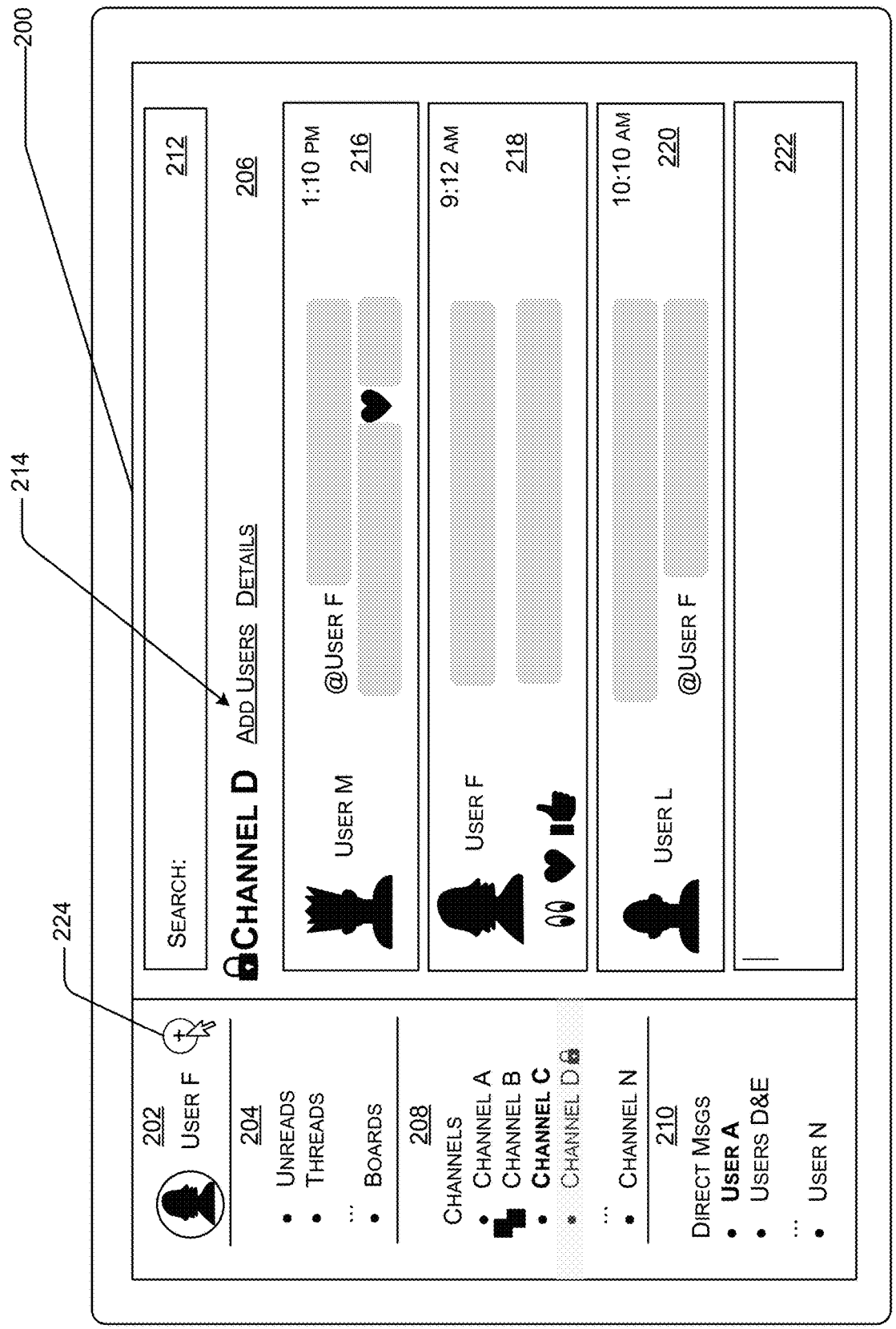
FIG. 2A illustrates an example user interface presented via a communication platform, as described herein.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed. In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or video content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In some examples, data presented via the second section can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of a channel) posted a message, performed an action, and/or the like. Additional details are described below.

In at least one example, the first section 202 of the user interface 200 can include a second sub-section 208 that includes user interface elements representing channels. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, different types of channels (e.g., public, private, shared, etc.) can be in different sections of the second sub-section 208, or can have their own sub-sections or sub-sections in the user interface 200. In some examples, channels associated with different workspaces can be in different portions of the second sub-section 208, or can have their own sections or sub-sections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third sub-section 210 that can include user interface elements representative of direct messages. That is, the third sub-section 210 can include user interface elements representative of virtual spaces that are associated with private messages between one or more users, as described above.

As described above, in at least one example, the user interface 200 can include a second section 206 that can be associated with data associated with virtual spaces of the communication platform. In some examples, data presented via the second section 206 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user posted the message and/or performed an action.

As described above, a "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2A, the user can interact with the user interface element that corresponds to Channel D in the second subsection 208 and as such, a feed associated with the channel can be presented via the second section 206 of the user interface. In some examples, the second section 206 can be associated with a header that includes user interface elements 214 representing data associated with Channel D. Furthermore, the second section 206 can include user interface elements 216, 218, and 220 which each represent messages posted to the channel. As illustrated, the user interface elements 216-220 can include an indication of a user who posted the message, a time when the message was posted, content associated with the message, reactions associated with the message (e.g., emojis, reactjis, etc.), and/or the like. In at least one example, the second section 206 can include an input mechanism 222, which can be associated with a composition user interface to enable a user to compose a message to be posted to the channel. That is, in at least one example, a user can provide input via the input mechanism 222 (e.g., type, speak, etc.) to generate a new message.

Figure 2B:
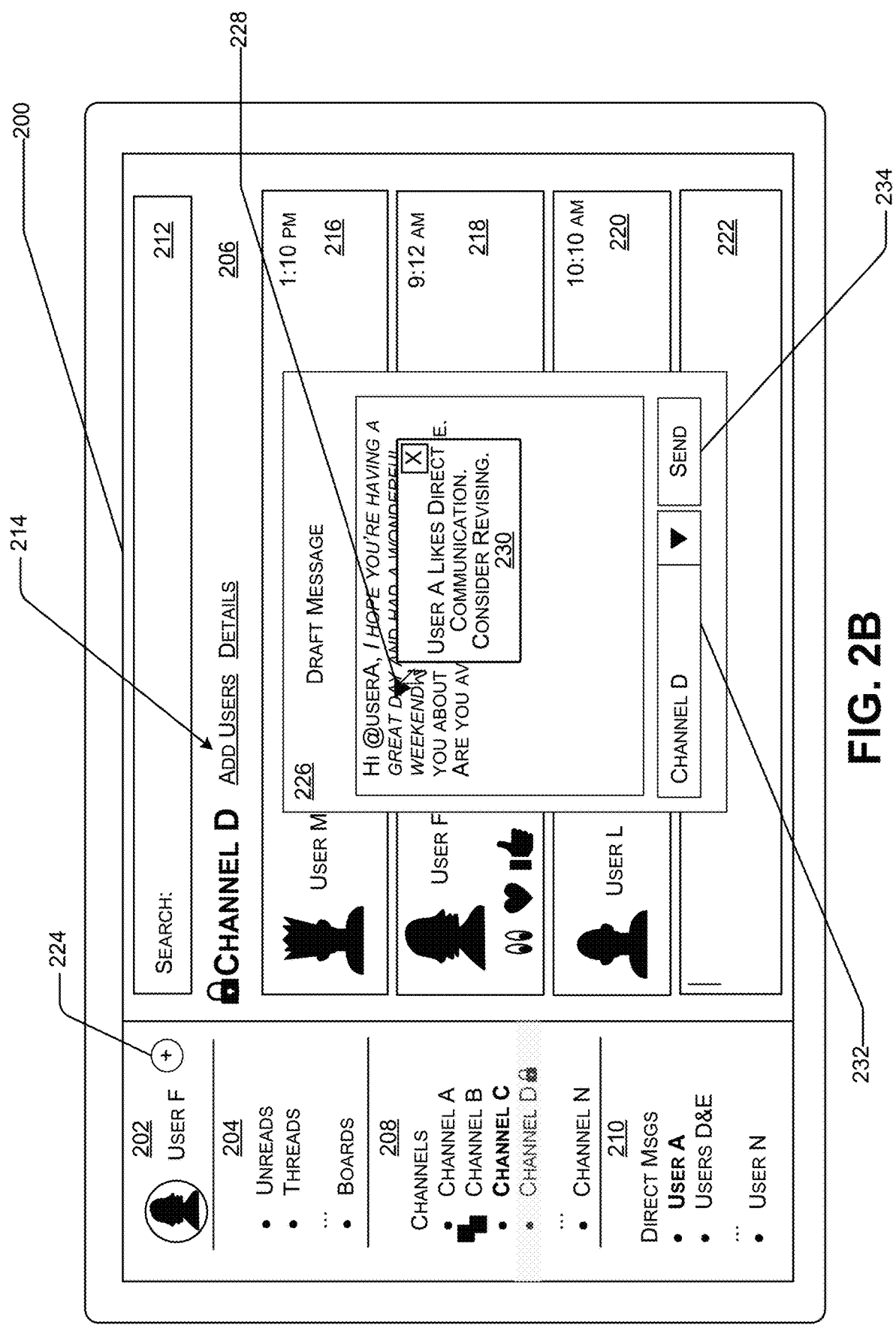
FIG. 2B illustrates another example of the user interface presented via the communication platform, as described herein, wherein a user interface element associated with a recommendation is presented via a composition user interface.

In some examples, users can generate new messages via other input mechanisms. For example, the user interface 200 can include a user interface element 224 that can be associated with an actuation mechanism. In at least one example, based at least in part on detecting actuation of the actuation mechanism, the communication platform can cause a composition user interface to be presented via the user interface 200. In some examples, a composition user interface can be presented via a pop-up, overlay, modal, new section of the user interface 200, a new user interface, and/or the like. FIG. 2B illustrates an example of such a composition user interface 226, wherein a user can compose a message. In at least one example, the composition user interface 226 can correspond to the composition user interface 150 of FIG. 1. For the purpose of this discussion, features and functions of a composition user interface are described with reference to the composition user interface 226. However, in additional or alternative examples, the same or similar features and functions can be availed via the composition user interface 222.

In at least one example, a message being composed via the composition user interface 226 can be associated with an indication that the message is a draft. In some examples, a user interface element can be presented via the composition user interface 226 to visually alert the user that the message is a draft. In some examples, a data structure representative of the message can be associated with a flag or other indicator indicating that the message is a draft. In at least one example, when a message is posted, such a flag or other indicator can be updated to indicate that the message has been posted (and is no longer a draft). For the purpose of this discussion, a message can be "posted" when it is associated with a virtual space and is presented via the virtual space. That is, a message can be posted to a channel, a direct message, or other virtual space when it is associated with the channel, the direct message, or the other virtual space and is rendered in association with the virtual space in the user interface 200. In some examples a message "posted" to a virtual space can be broadcast, sent, or otherwise provided to an instance of the application 140 on the user computing device 104 for presentation via the user interface 200.

In at least one example, one or more recommendations can be surfaced via the composition user interface 226. In some examples, recommendations can be surfaced as annotations, which can be presented in-line with text or other input associated with a draft message. For example, recommendations can be presented as greyed out text (or text of another color or shade) in-line via the composition user interface 226 and a user can select or otherwise interact with the greyed out text for the feedback component 116 to autocomplete the text of the message such that the greyed out text is added directly to the text of the message being generated via the composition user interface 226. In some examples, recommendations can be presented via a user interface element, such as a pop-up, overlay, or the like while a draft message is composed. In some examples, such recommendations can be presented automatically (e.g., without user input) or based on detecting a user interaction with an annotation or other indication that a recommendation is available.

For example, as illustrated in FIG. 2B, the feedback component 116 can cause the message to be annotated with one or more user interface elements. An example of such a user interface element 228 is illustrated in FIG. 2B. In at least one example, the user interface element 228 can be associated with an actuation mechanism that when actuated can cause a recommendation to be presented via the composition user interface 226. For instance, based at least in part on detecting actuation of an actuation mechanism associated with the user interface element 228, the feedback component 116 via the application 140 can cause a user interface element 230 associated with the recommendation to be presented via the composition user interface 226. In some examples, the user interface element 230 can be presented as a pop-up, overlay, or the like. In some examples, the recommendation can relate to an aspect of the message, as described above. In some examples, the recommendation can prompt the user to perform an action or can be associated with an action that can be performed by the communication platform. As illustrated in FIG. 2B, in some examples, such annotations can be presented while the user is composing the message.

In some examples, the recommendation can be generated to optimize the message for the recipient. As illustrated in FIG. 2B, in some examples, a recipient can be determined based at least in part on being tagged in the draft message (e.g., User A is the recipient as indicated by the tag/mention of User A in the draft message). In some examples, a recipient can be determined based on context of where the composition user interface 226 is initialized. For instance, if the composition user interface 226 is initialized in a direct message between two users, the recipient can be determined to be the user who is not the sender but is also part of the direct message. In some examples, a recipient can be a user, a channel, a direct message, a board, a workspace, an organization, and/or the like. As described above, in at least one example, the feedback component 116 can utilize data associated with the draft message and/or data associated with the recipient to generate one or more recommendations. In some examples, the feedback component 116 can utilize one or more machine-trained model(s) to generate the one or more recommendations. As described above, in some examples, the recommendation(s) can relate to aspect(s) of the draft message.

In some examples, the composition user interface 116 can include a user interface element 232 that can enable the user to select a virtual space for posting the message. In some examples, the user interface element 232 can be associated with an indication of a virtual space that has been recommended by the feedback component 116. In some examples, the user interface element 232 can be associated with an indication of a virtual space from which the composition user interface 226 is initialized. In some examples, the user interface element 232 can include a mechanism (e.g., a drop down, etc.) to enable the user to self-select a virtual space for posting the message. In some examples, the composition user interface 226 can include a user interface element 234 that can be associated with an actuation mechanism. In response to detecting actuation of the actuation mechanism, the message can be posted to the selected virtual space. In some examples, another input mechanism (e.g., via a keyboard, spoken input, etc.) can cause the message to be posted to the selected virtual space.

Figure 2C:
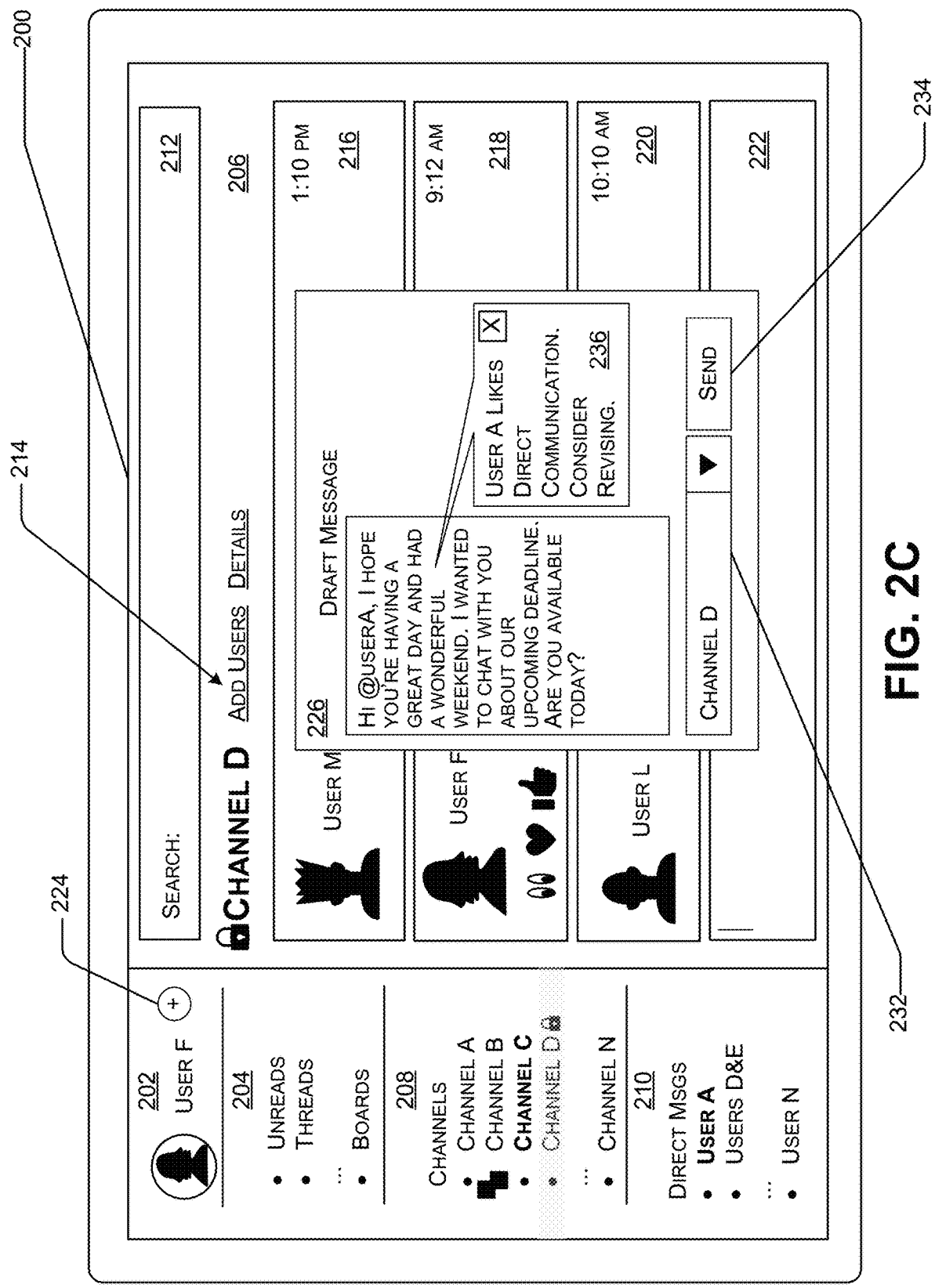
FIG. 2C illustrates another example of the user interface presented via the communication platform, as described herein, wherein a user interface element associated with a recommendation is presented via a composition user interface.

FIG. 2C illustrates another example of the user interface 200 and the composition user interface 226, wherein instead of annotating the draft message with user interface elements that require actuation or another interaction, as illustrated in FIG. 2B, the feedback component 116, via the application 140, can cause the recommendation to be presented via a user interface element 236 automatically, without user input. In some examples, as illustrated in FIG. 2C, the user interface element 236 can present the recommendation automatically, without user input, while the user is composing the draft message via the composition user interface 226.

Figure 2D:
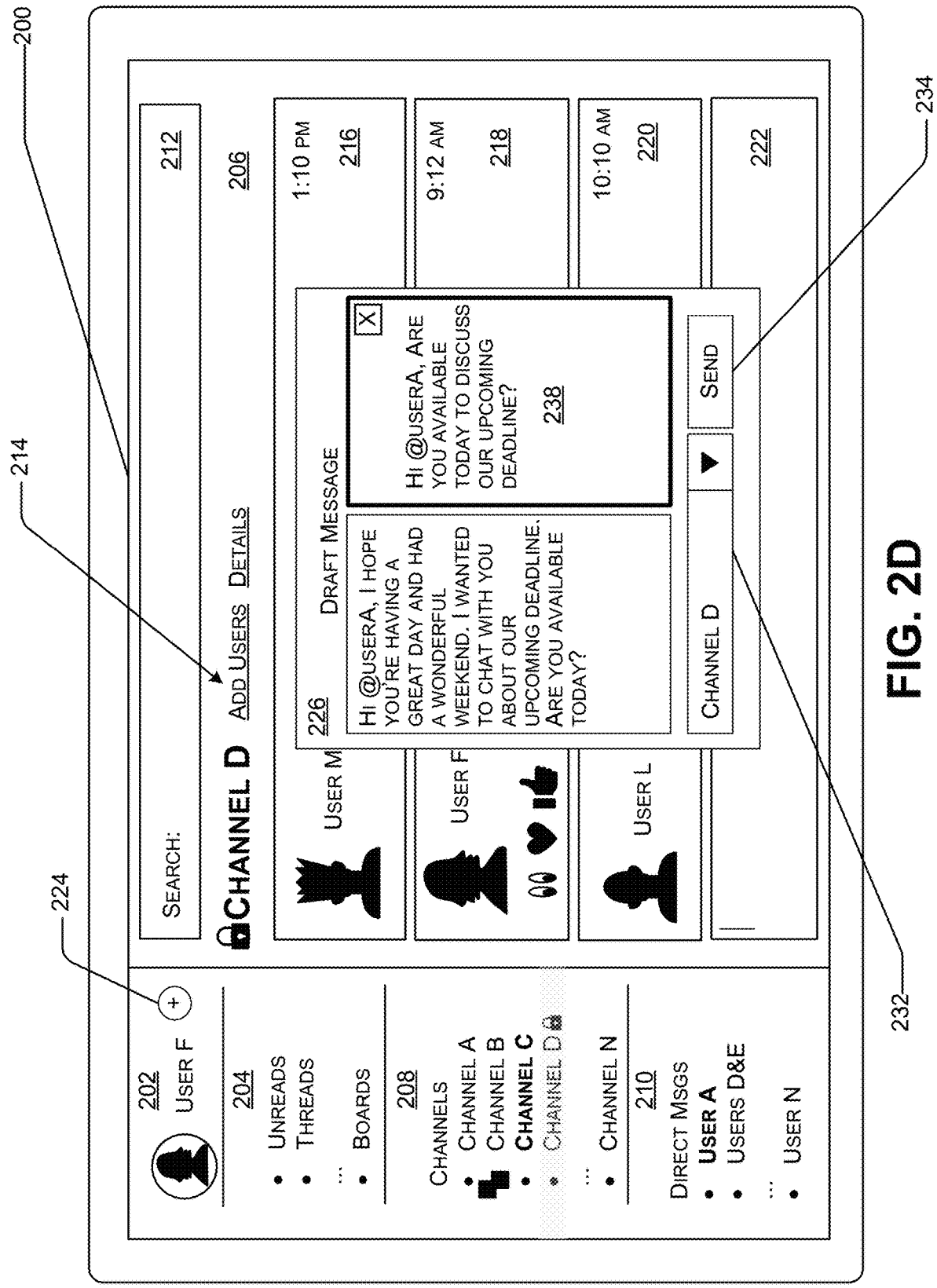
FIG. 2D illustrates another example of the user interface presented via the communication platform, as described herein, wherein a user interface element associated with a recommendation is presented via a composition user interface.

FIG. 2D illustrates another example of the user interface 200 and the composition user interface 226, wherein instead of annotating the draft message with user interface elements (e.g., that require actuation or not), the recommendation is presented via a user interface element 238 after the draft message has been composed. That is, in some examples, the feedback component 116 can generate a recommendation after the draft message is composed, and before the message is posted. In some examples, the recommendation can be another draft of the draft message rewritten based on recommendation(s) generated by the feedback component 116. In at least one example, the user can interact with the user interface element 238 to select the draft message associated therewith to be posted, instead of the draft message composed by the user. In some examples, the user can interact with the user interface element 238 to selectively choose which modifications to accept and reject. That is, in some examples, the user can accept a portion of a recommendation.

As described above, the feedback component 116 can output recommendations while a message is being composed in substantially real-time. In some examples, the feedback component 116 can output recommendations after a message has been composed, after a message has been sent, or the like. In some examples, recommendations can be output automatically. In some examples, recommendations can be output responsive to an interaction with the user interface 200. That is, in some examples, recommendations can be triggered to be presented when a user performs an operation or otherwise interacts with the user interface 200.

Figure 3:
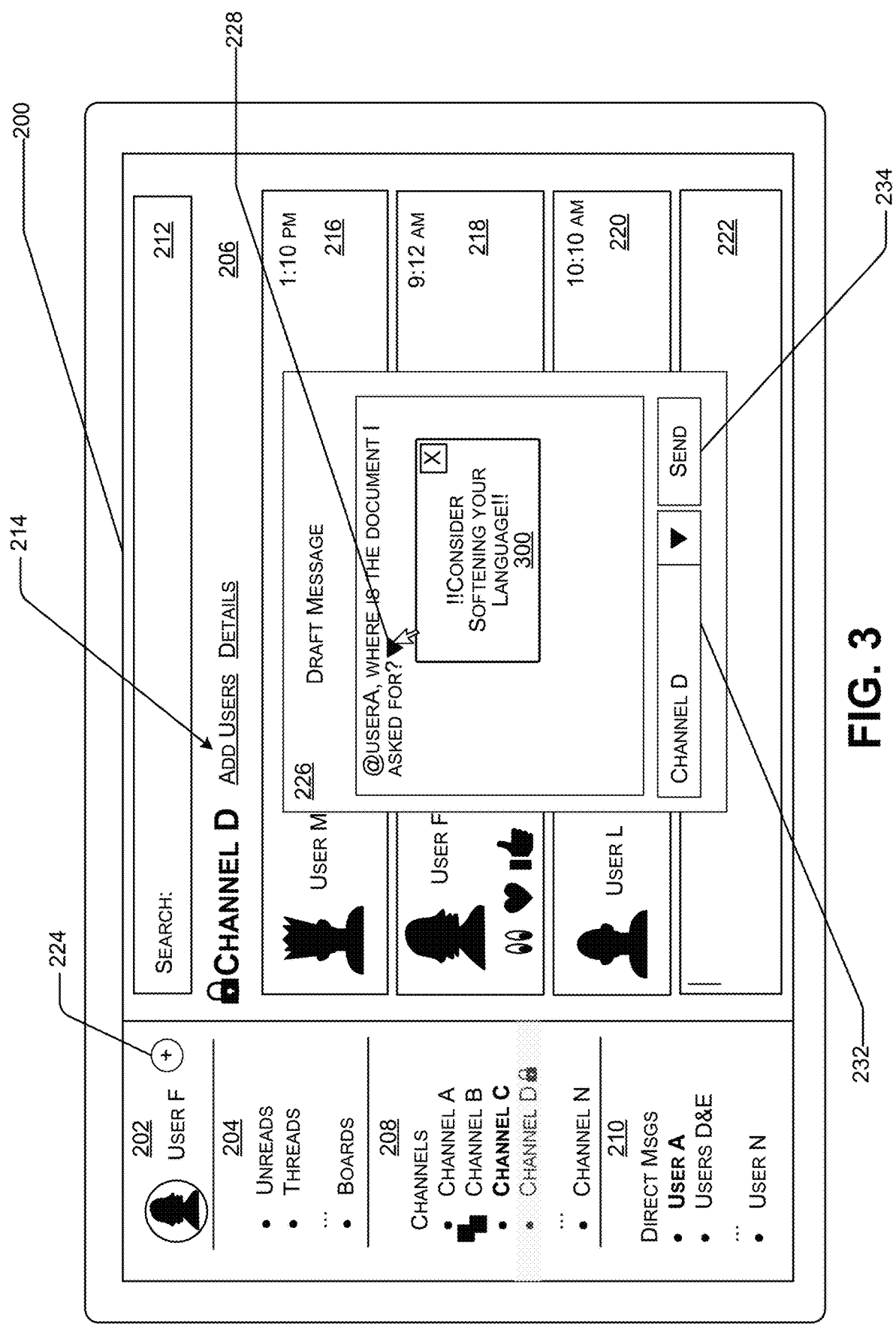
FIG. 3 illustrates another example of a user interface presented via a communication platform, as described herein, wherein a user interface element associated with a recommendation regarding tone or sentiment is presented via a composition user interface.

As described above, the feedback component 116 can output recommendations regarding aspects of messages for optimization, change, revision, or other update. In some examples, an aspect of the new message can comprise a tone or sentiment of the new message. FIG. 3 illustrates an example, wherein a user interface element 300, presented via the user interface 200, is associated with a recommendation regarding tone or sentiment of the new message. In some examples, the feedback component 116 can determine that a tone or sentiment is too harsh or too soft for the recipient. As such, the feedback component 116 can recommend changing the tone or sentiment. In some examples, appropriate tone or sentiment can be based on data associated with the recipient, similar users to the recipient (e.g., users associated with similarity metrics that are within a threshold), a group of users (e.g., a workspace, an organization), a virtual space (e.g., a channel, a direct message, etc.), etc. In some examples, different language and/or cultures can be used to determine appropriate tone or sentiment. In some examples, a model, trained based at least in part on data associated with the recipient, similar users to the recipient (e.g., users associated with similarity metrics that are within a threshold), a group of users (e.g., a workspace, an organization), a virtual space (e.g., a channel, a direct message, etc.), etc. can be used to determine whether tone or sentiment is appropriate. In some examples, the user interface element 300 can include a recommendation to soften language, use more direct language, reduce niceties, omit hyperboles, include a joke, exclude a joke, include an emoji/reactji, exclude an emoji/reactji, etc. In some examples, the user interface element 300 can generally reference tone or sentiment. In some examples, the user interface element 300 can identify particular words, phrases, or other contents of the message to modify to improve tone or sentiment. In some examples, the user interface element 300 can include an actuation mechanism that when actuated can cause the feedback component 116 to modify the draft message to improve tone or sentiment.

In addition to recommendations regarding tone and sentiment, as described above, recommendations output by the feedback component 116 can relate to whether to include (or not include) an emoji, a reactji, an image, a video, a word, and/or a phrase (without regard to tone or sentiment). In some examples, if an emoji, a reactji, an image, a video, a word, and/or a phrase is recommended, the recommendation can include a particular emoji, reactji, image, video, word, and/or phrase. In some examples, a recommendation can relate to a time for posting a message, a date for posting a message, or the like.

Figure 4:
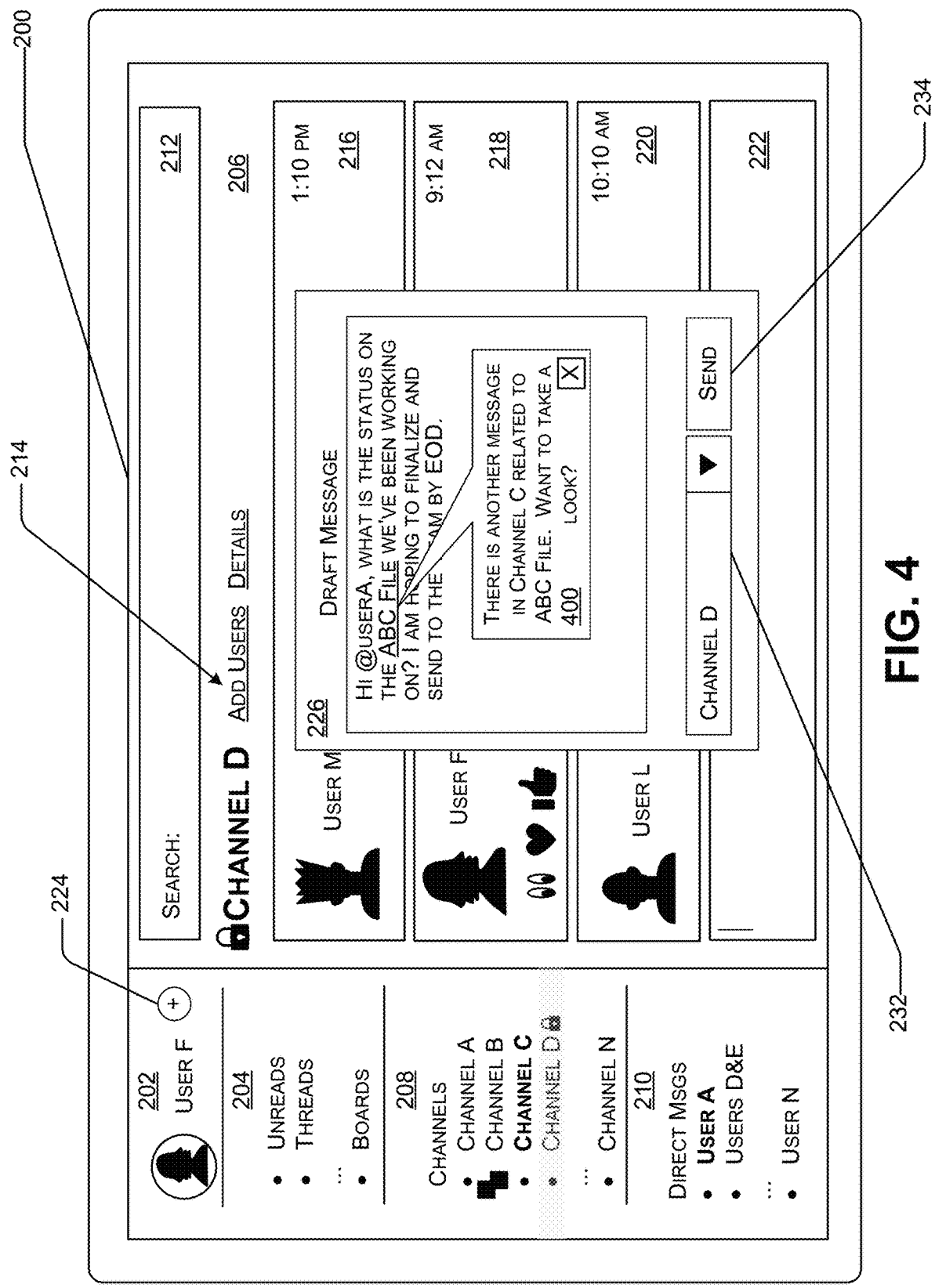
FIG. 4 illustrates another example of a user interface presented via a communication platform, as described herein, wherein a user interface element associated with a recommendation referencing another resource of the communication platform is presented via a composition user interface.

As described above, in some examples, the feedback component 116 can output recommendations that refer to another channel, direct message, board, thread, and/or the like wherein an object referenced in the new message has been referenced or is being referenced. FIG. 4 illustrates an example of a user interface element 400, presented via the user interface 200, that references another message in another channel related to an object referenced in the draft message. As described above, in some examples, the feedback component 116 can analyze input received via the composition user interface 226 and can determine that such input is associated with an object (e.g., "ABC File"). The feedback component 116 can analyze data associated with the communication platform to identify whether there are other references to the object. In at least one example, based at least in part on identifying another reference to the object (e.g., another message in Channel C), the feedback component 116 can output the user interface element 400. In some examples, the user interface element 400 can include an embedded link or other actuation mechanism that when actuated can enable the user to access the referenced channel and/or message (e.g., Channel C). That is, in at least one example, by selecting such an embedded link and/or message, or otherwise interacting with the user interface element 400, the feedback component 116 can cause the referenced channel and/or message to be presented via the user interface 200. In some examples, the user can opt to post a message in association with the other reference instead of posting the message being composed via the composition user interface 226, or can opt not to post anything at all.

Figure 5:
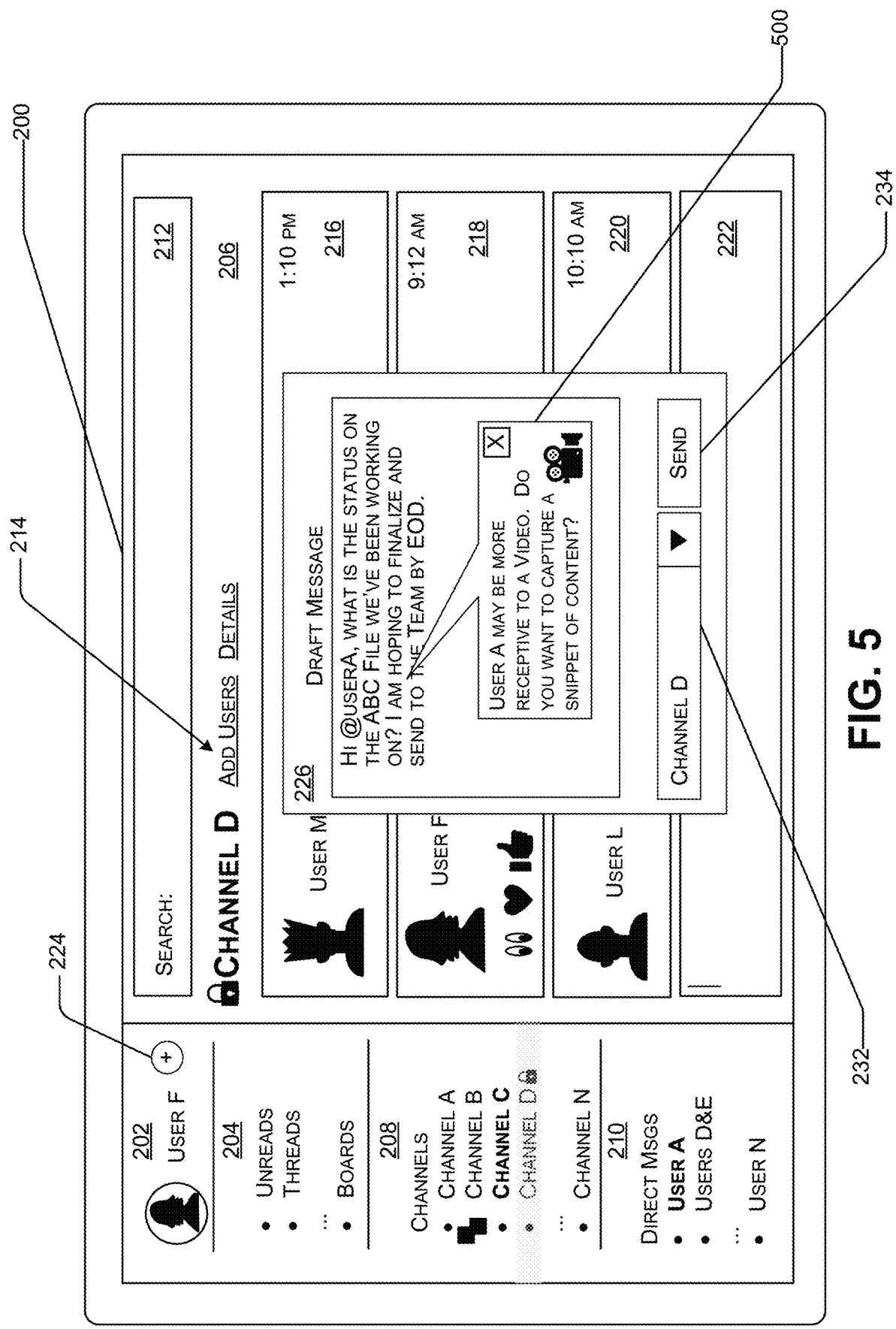
FIG. 5 illustrates another example of a user interface presented via a communication platform, as described herein, wherein a user interface element associated with a recommendation regarding a format of a message is presented via a composition user interface.

As described above, the feedback component 116 can output a recommendation regarding an aspect of the new message that can comprise a format, such as a text message, a video message, etc. FIG. 5 illustrates an example of a user interface element 500, presented via the user interface 200, that is associated with a recommendation regarding the format of the draft message. In FIG. 5, the user has started to compose a message with a text format. The feedback component 116 can determine that a video message may be better received by the recipient based on the frequency or recency of usage of particular communication mechanisms (e.g., video conferences, snippets of content, etc.) from the history of the recipient. In some examples, the feedback component 116 can utilize the last used communication mechanism or a preferred communication setting of the recipient to provide a recommendation. As such, the feedback component 116 can output a recommendation indicating that a video message may be better received by the recipient. In some examples, the user interface element 500 associated with the recommendation can include a mechanism to enable the user to initialize a camera and/or microphone to generate the new message in the recommended format. For example, by actuating an actuation mechanism associated with the user interface element 500, the application 140 can enable the user to record a video message (e.g., a snippet of content) that can be sent or otherwise provided to the user.

Figure 6A:
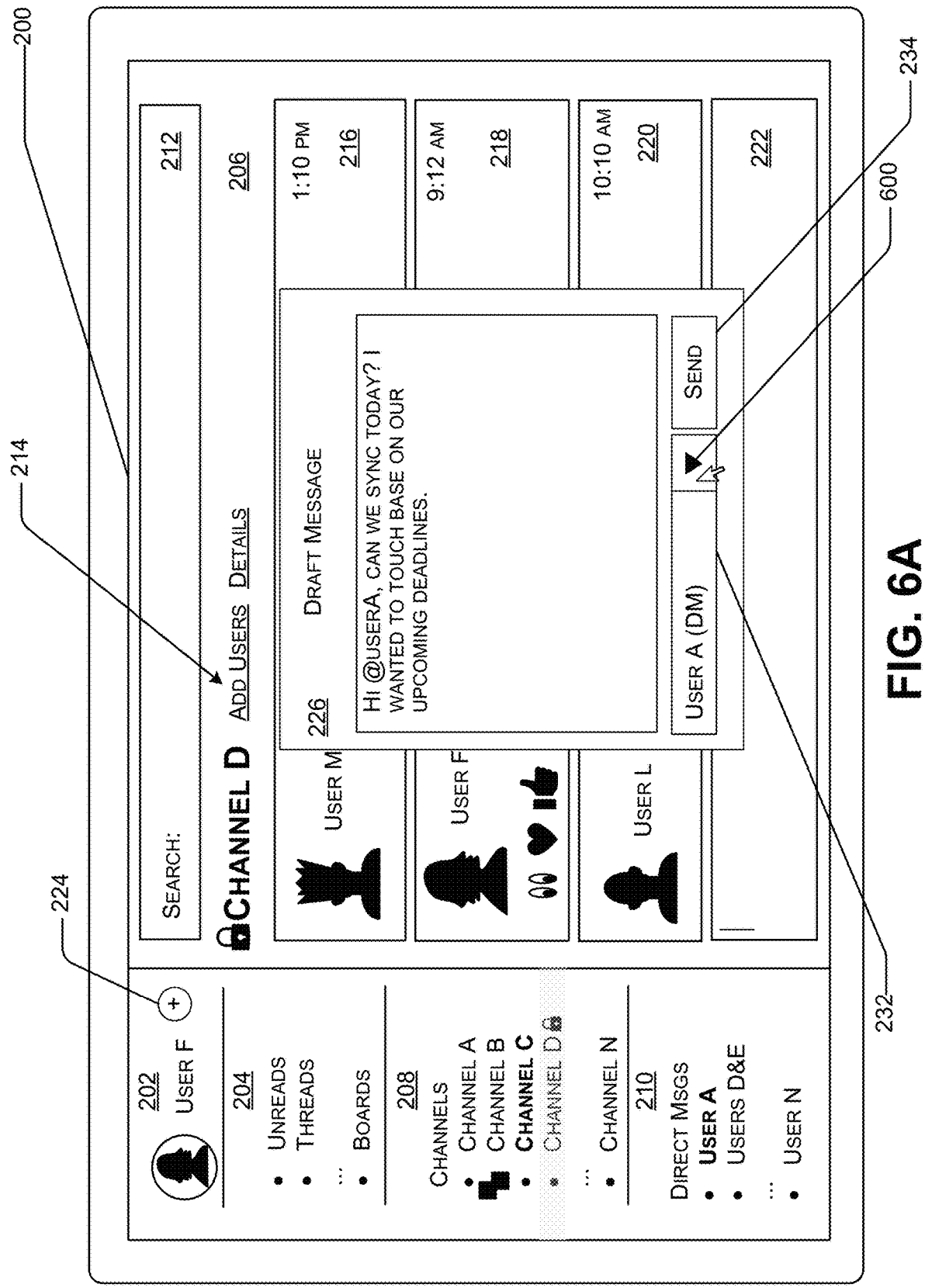
FIG. 6A illustrates another example of a user interface presented via a communication platform, as described herein, wherein a user interface element associated with a recommendation regarding virtual space for presenting a message is presented via a composition user interface.
Figure 6B:
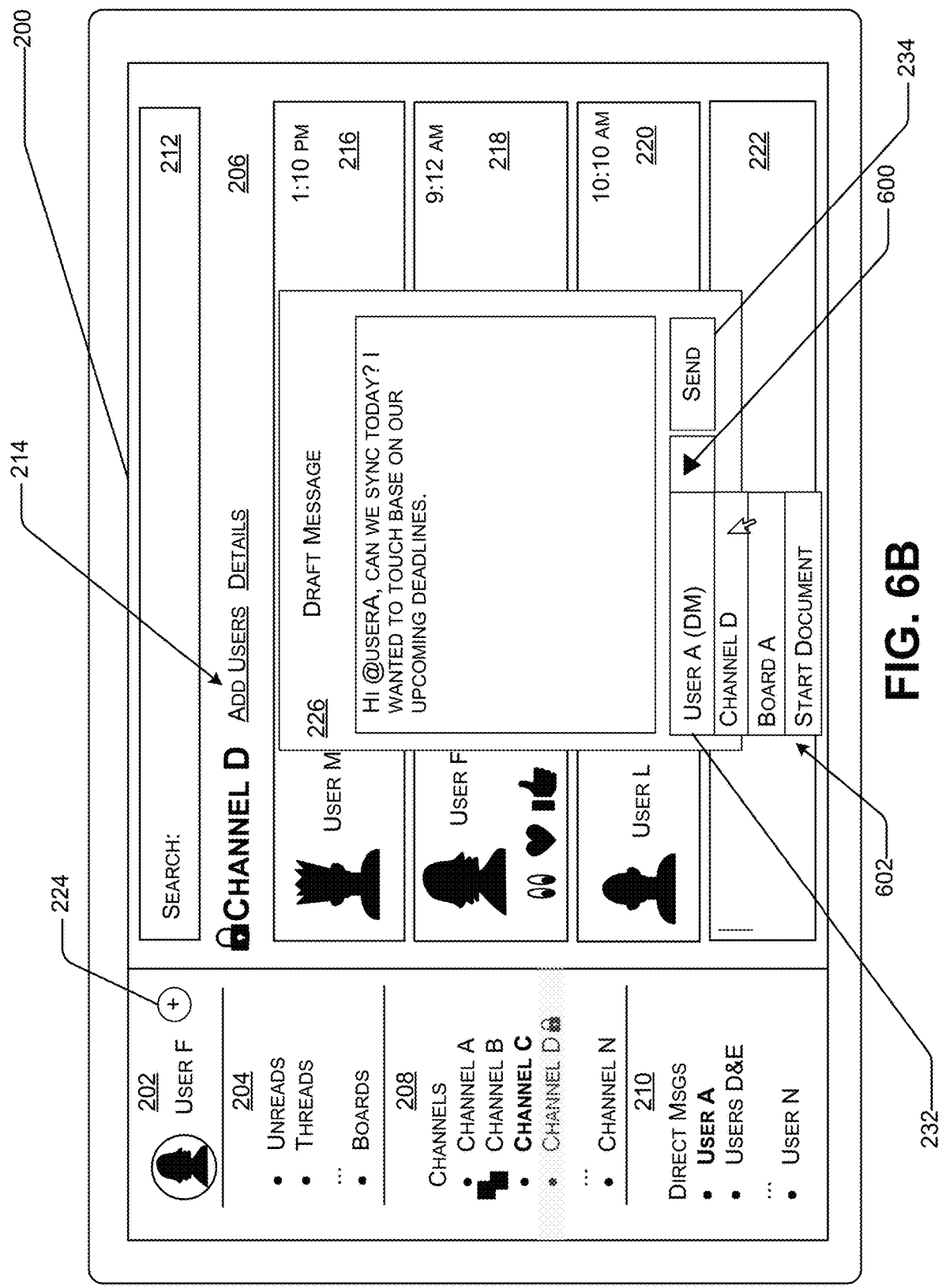
FIG. 6B illustrates additional details associated with the user interface of FIG. 6A.

As described above, the feedback component 116 can output a recommendation regarding an aspect of the new message that can comprise a virtual space with which the new message is to be posted, wherein the virtual space comprises a channel, a direct message, or a board. FIGS. 6A and 6B illustrate examples of the user interface 200 and the composition user interface 226, wherein the composition user interface 226 is associated with a recommendation for a virtual space (e.g., a channel, a direct message, a board, a collaborative document, e-mail, etc.) wherein the new message is to be posted. As described above, in some examples, the composition user interface 116 can include a user interface element 232 that can enable the user to select a virtual space for posting the message. In some examples, the user interface element 232 can be associated with an indication of a virtual space that has been recommended by the feedback component 116 (e.g., a direct message to User A). In some examples, the user interface element 232 can include a mechanism 600 (e.g., a drop down, etc.) to enable the user to self-select a virtual space for posting the message. For example, based at least in part on interacting with the mechanism 600, the feedback component 116, via the application 140, can cause user interface elements 602 representative of one or more alternative virtual spaces to be presented. In at least one example, the user can select one of the alternative virtual space(s) for posting the new message. In some examples, additional or alternative user interface elements can be presented via the user interface 200 which can recommend one or more virtual spaces for posting the message.

In some examples, the feedback component 116 can output a recommendation with respect to another resource with which the new message can be associated. For instance, in some examples, the feedback component 116 can recommend that a new message be saved as a document and/or in a document storage instead of, or in addition to, being posted to a virtual space. A document can be an object that is external or internal to a virtual space. In some examples, a document can be associated with a different input mechanism or storage format. In some examples, documents can be associated with different collaborators who can have the same or different permissions.

Figure 7A:
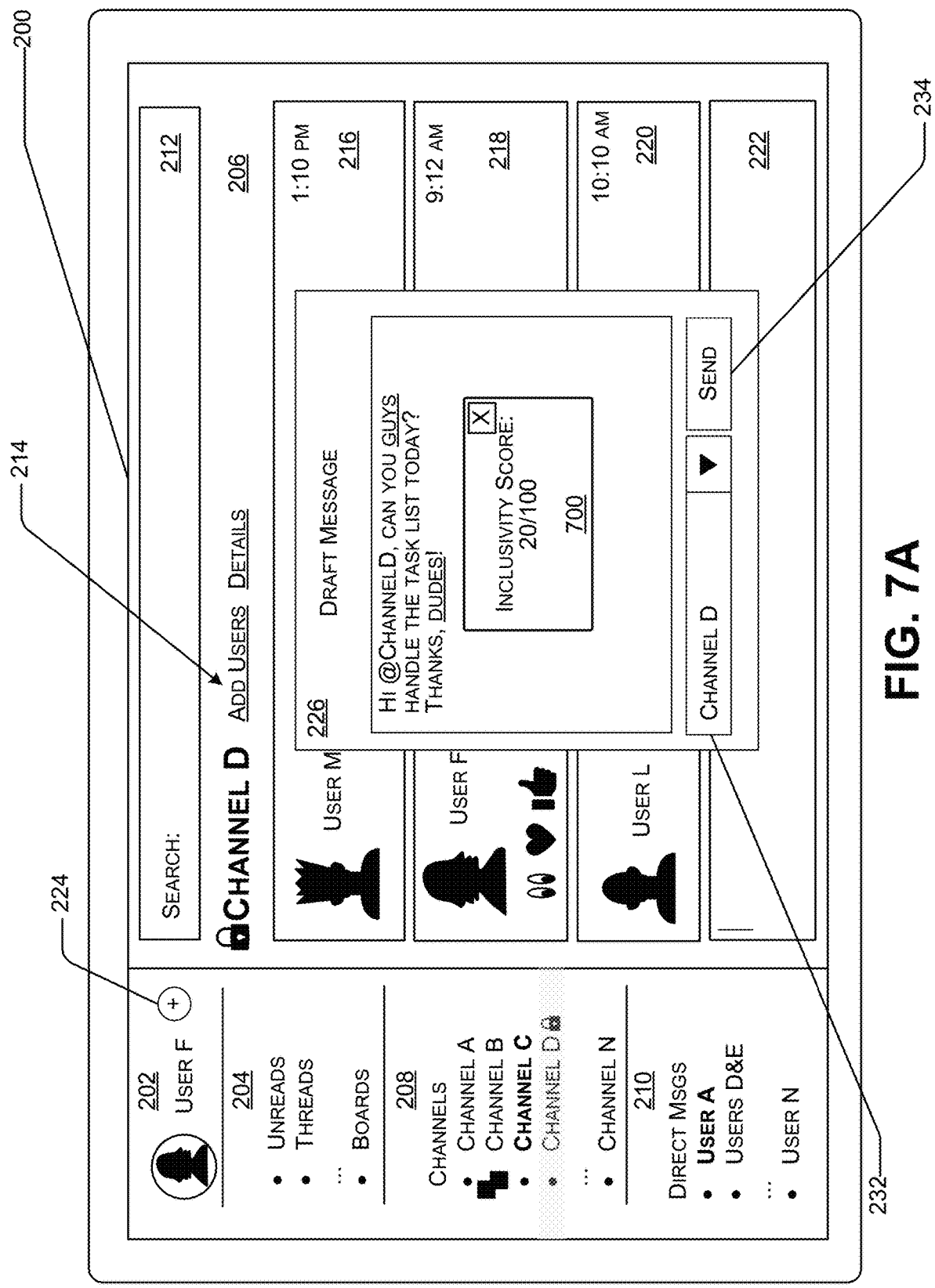
FIG. 7A illustrates another example of a user interface presented via a communication platform, as described herein, wherein a user interface element associated with a recommendation regarding an inclusivity score of a message is presented via a composition user interface.
Figure 7B:
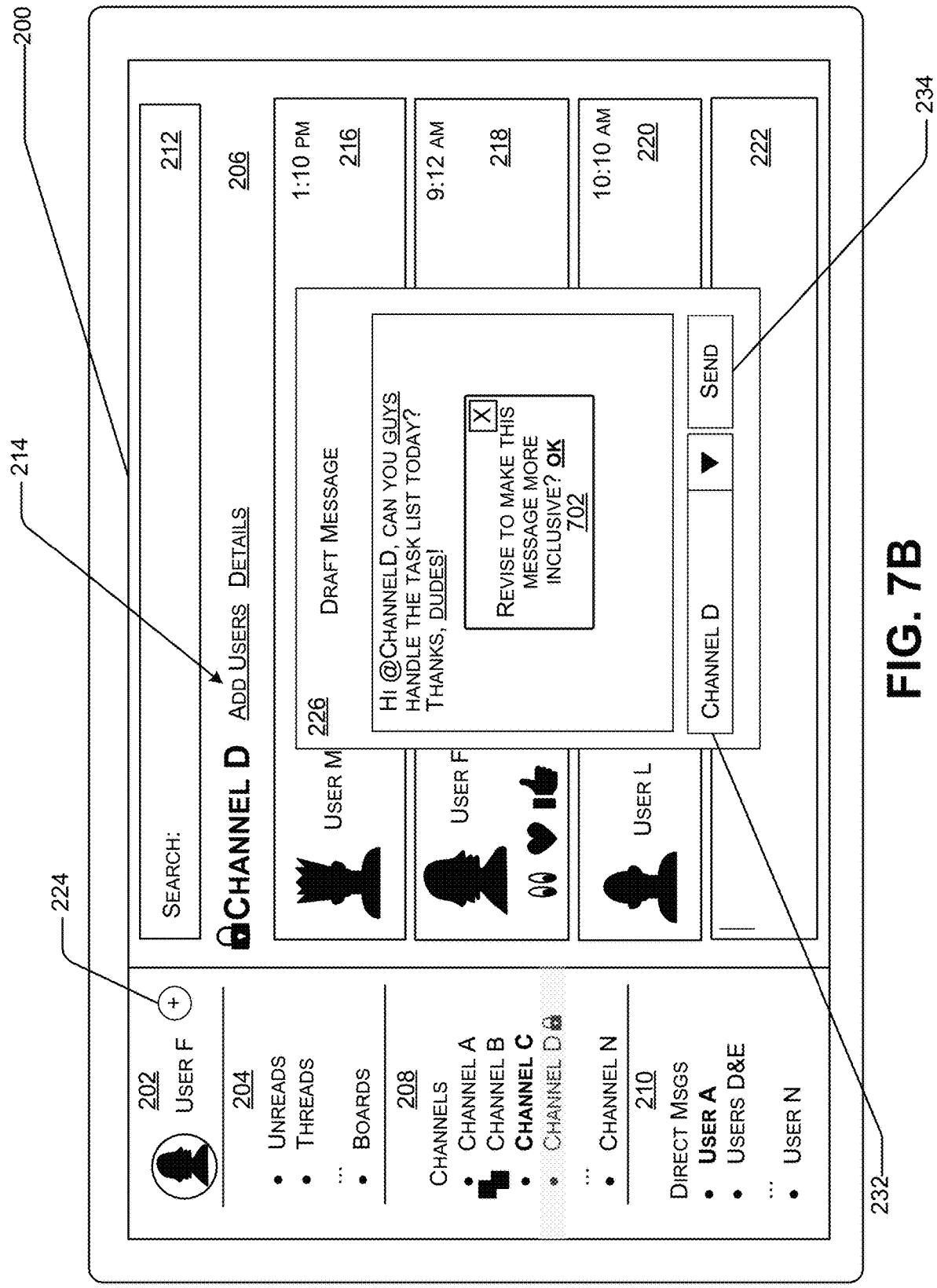
FIG. 7B illustrates another example of a user interface presented via the communication platform, as described herein, wherein a user interface element associated with a recommendation based on an inclusivity score of a message is presented via a composition user interface.

In some examples, as described above, the feedback component 116 can determine scores or other indicators, associated with particular qualities, which can be output in association with recommendations and/or can be used to generate a recommendation. FIGS. 7A and 7B illustrate examples of user interface elements 700 and 702, respectively, which can be presented via the user interface 200. In FIG. 7A, an inclusivity score is presented via the user interface element 700. In some examples, the feedback component 116 can annotate the composition user interface 226 to include user interface elements indicating which words, phrases, or the like that can be updated to improve the inclusivity score (e.g., "guys" and "dudes"). In FIG. 7B, the user interface element 702 is associated with a recommendation that can be based at least in part on the inclusivity score. In some examples, the user interface element 702 can include an actuation mechanism that when actuated can modify the draft message to improve the inclusivity score (and thus make the message more inclusive). For example, by actuating the actuation mechanism associated with the user interface element 702, the feedback component 116 can update "you guys" to "y' all" and "dudes" to "all" to improve the inclusivity score of the message. In FIG. 7B, the user interface element 702 is associated action that can be performed by the communication platform (e.g., the feedback component 116) in response to receiving an input associated with the user interface element 702. That is, based at least in part on receiving an indication of an input associated with the user interface element 702, the communication platform can automatically modify words in the message to improve the inclusivity score of the message.

Figure 8:
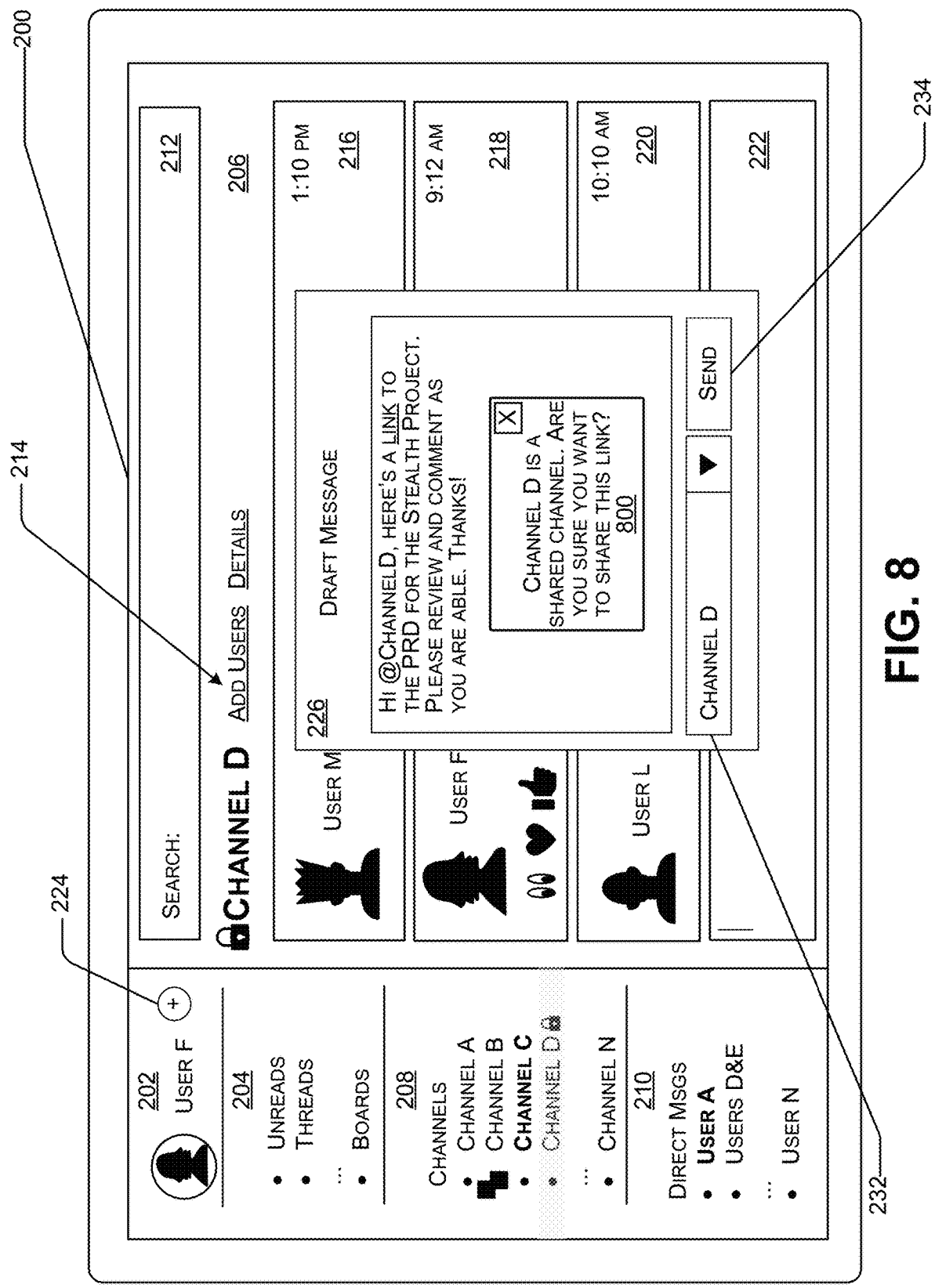
FIG. 8 illustrates another example of a user interface presented via a communication platform, as described herein, wherein a user interface element associated with a recommendation providing context of a message is presented via a composition user interface.

As described above, in some examples, the feedback component 116 can output recommendations that provide context to a user composing a message. FIG. 8 illustrates an example wherein a user interface element 800, presented via the user interface 200, is associated with a recommendation that provides context to the user composing the draft message. As described above, recommendations providing such context can be based at least in part on an intended recipient and/or an intended virtual space to which the message is to be posted. As an example, if a message is to be posted in a channel associated with another organization (e.g., if Channel D is a shared channel), the feedback component 116 can output a recommendation that provides an indication that the channel is associated with another organization, as illustrated in FIG. 8. In some examples, the feedback component 116 can analyze the message contents to identify words, phrases, and/or other contents of the message that may not be appropriate for sharing with the other organization. For example, the user interface element 800 identifies a link that may not be appropriate for sharing and includes an ask as to whether the user does in fact want to post the link to Channel D.

FIGS. 1-8 make reference to "user interface elements." A user interface element can be any element of the user interface that is representative of an object, message, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

Figure 9:
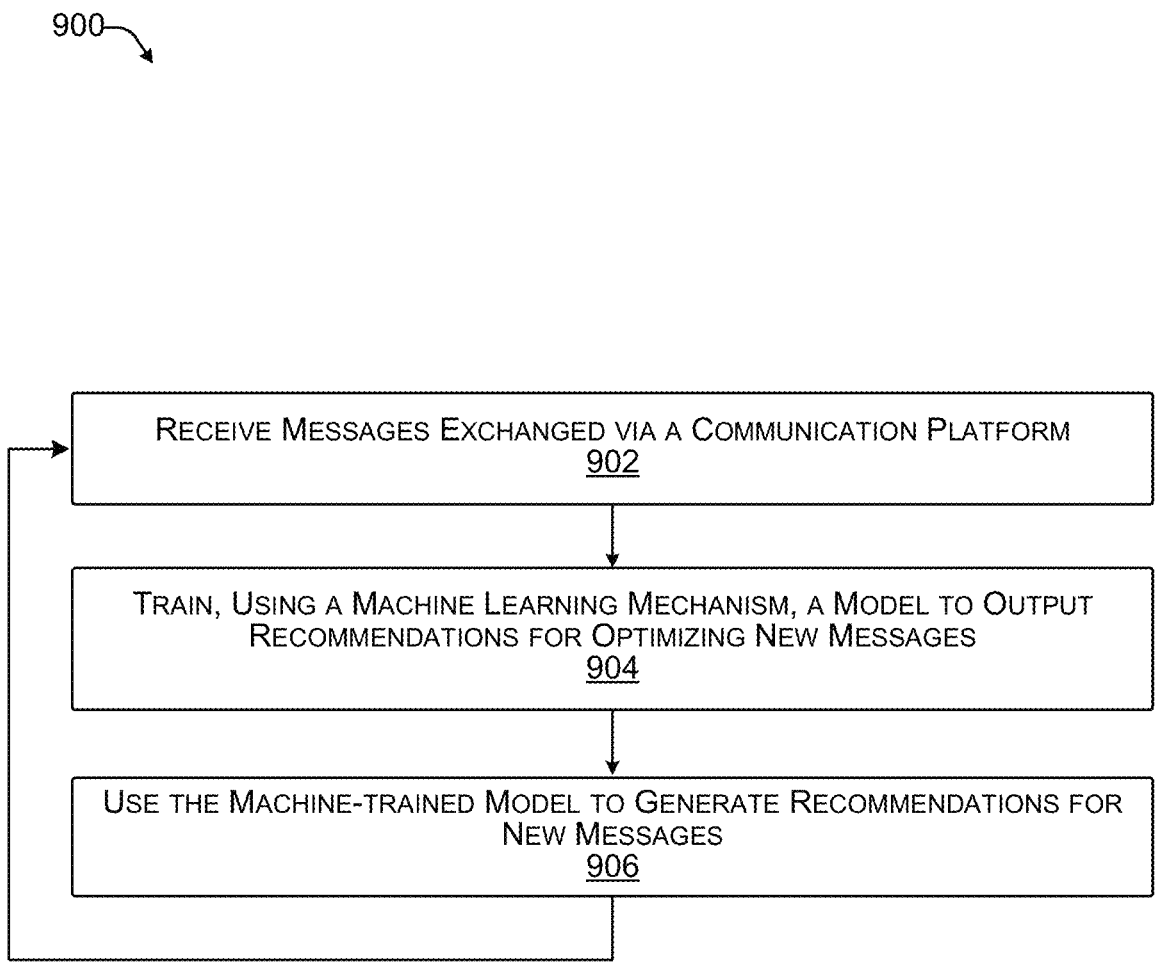
FIG. 9 illustrates an example process for training a model for generating recommendations, as described herein.
Figure 10:
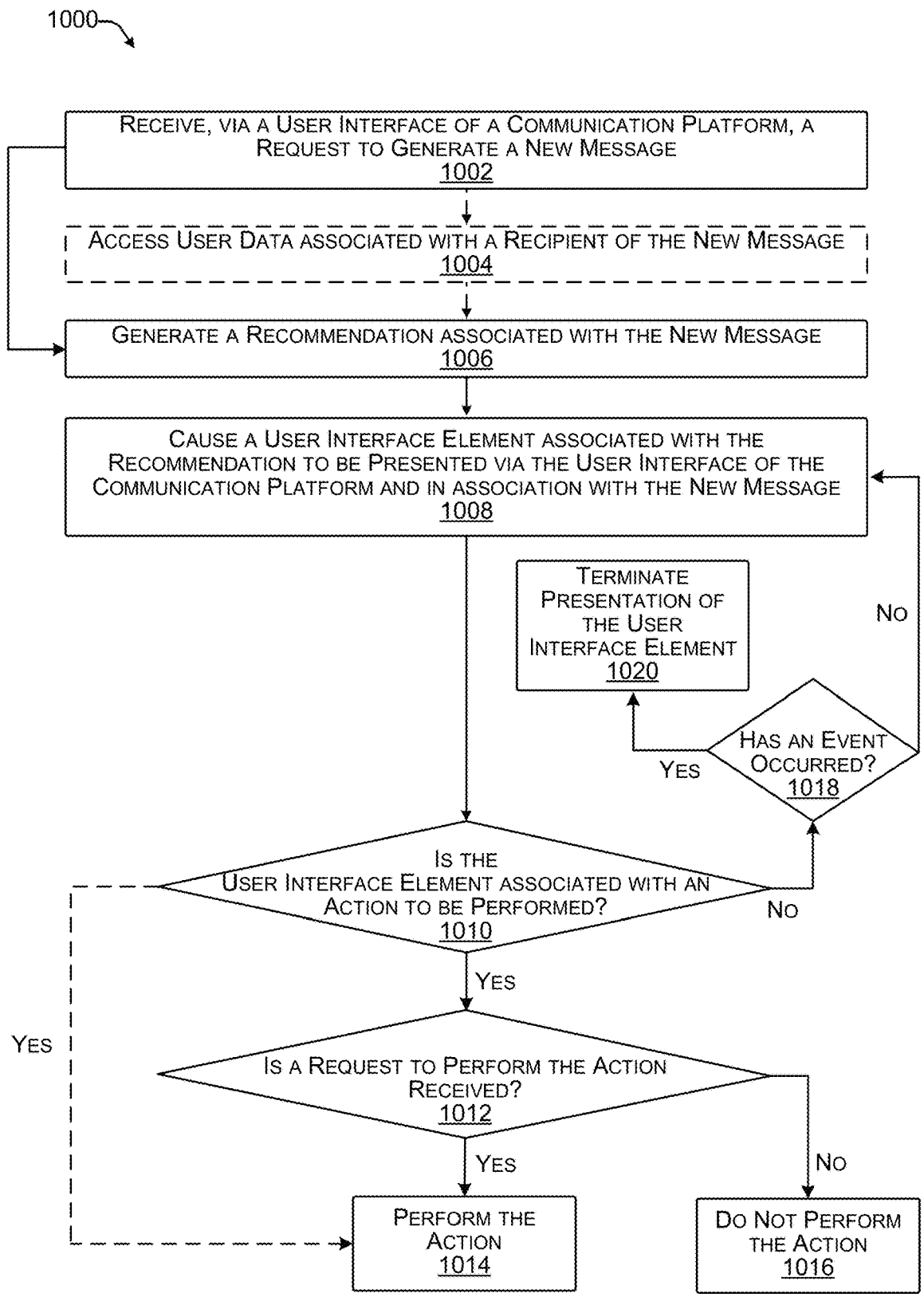
FIG. 10 illustrates an example process for generating a recommendation associated with a new message, as described herein.

FIGS. 9 and 10 are flowcharts showing example processes involving techniques as described herein. The processes illustrated in FIGS. 9 and 10 are described with reference to components of the environment 100 shown in FIG. 1 for convenience and ease of understanding. However, the processes illustrated in FIGS. 9 and 10 are not limited to being performed using the components described above with reference to the environment 100. Moreover, the components described above with reference to the environment 100 are not limited to performing the processes illustrated in FIGS. 9 and 10.

The processes in FIGS. 9 and 10 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 9 and 10 can be combined in whole or in part with each other or with other processes.

As noted above, the processes illustrated in FIGS. 9 and 10 are described with reference to components described above in the environment 100 shown in FIG. 1 for convenience and ease of understanding. FIG. 1, however, illustrates a single user computing device 104. In practice, the environment 100 can have multiple (e.g., tens of, hundreds of, thousands of, millions of, etc.) user computing devices that are each similarly configured to the user computing device 104.

FIG. 9 illustrates an example process 900 for training a model for generating recommendations, as described herein.

At operation 902, functional component(s) of the communication platform can receive messages exchanged via the communication platform. In at least one example, users of the communication platform can send and receive messages using the communication platform. In some examples, a "sent" message can be received by the communication platform (e.g., the channel management component 118, the direct message management component 119, etc.) and can be posted to a virtual space (e.g., a channel, a direct message, etc.). When posted, the intended recipient can "receive" the message. That is, the server(s) 102 can receive messages and send such messages to their intended recipients via posting the message to a particular virtual space. In some examples, as described above, "posting" a message can comprise sending a message to a channel, direct message, or other virtual space such that it is accessible to at least an intended recipient. In at least one example, messages sent and received using the communication platform can be stored in the datastore 122. In some examples, such messages can be referred to as a "corpus of messages." In some examples, reactions (e.g., emojis, reactjis, etc.) to messages, responsive messages (e.g., in threads or otherwise), etc. can be associated with messages exchanged via the communication platform.

At operation 904, a functional component of the communication platform can train, using a machine learning mechanism, a model to output recommendations for optimizing new messages. As described above, in some examples, a functional component of the communication platform can train model(s) using machine learning mechanism(s). In at least one example, a machine learning mechanism can comprise a supervised learning algorithm (e.g., linear regression, Naïve Bayes, nearest neighbors, decision tree, support vector machine, neural network, etc.), an un-supervised learning algorithm (e.g., k-means, hierarchical clustering, Hidden Markov model, self-organizing map, Gaussian mixture model, etc.), a semi-supervised learning algorithm, a reinforcement learning algorithm (e.g., Q-learning, temporal difference, deep adversarial networks, etc.), and/or the like.

In some examples, messages, as received at operation 902, can be used as training data for the model(s). That is, the messages can be used for training a model using one or more of the machine learning mechanisms described above.

In some examples, additional or alternative data can be used for training a model. For example, additional or alternative communication data can be used for training the model. Such communication data can include emails, text messages, social media posts, comments and/or edits to documents that are shared and/or not shared. In some examples, such communication data can be associated with the communication platform and/or third-party platforms or services. In some examples, interaction data, indicative of interactions of users and the communication platform can be used as training data. Such interaction data can include reactions (e.g., emojis, reactjis, etc.) to messages, responsive messages (e.g., in threads or otherwise), etc. In some examples, user data, which can include preferences (e.g., explicitly or implicitly determined), classifications of users (e.g., personality or strengths), roles and/or positions of users (e.g., based on an organization chart, learned, etc.), etc., can be used as training data for a model. In some examples, data associated with messages such as a message type (e.g., a channel message, a direct message, an announcement, a private message, a public message, etc.), a format of a message (e.g., text format, video format, combination of format(s), etc.), and/or the like can be used as training data for a model. In some examples, data associated with virtual spaces to which messages are posted (e.g., a public channel, a private channel, an announcement channel, a shared channel, a channel of a particular topic, a direct message virtual space, a board, etc.) can be used as training data for training a model. In some examples, user data can be used for training a model, as described above.

In some examples, machine-trained model(s) can be trained on subsets of the messages and/or other interactions associated with the users of the communication platform such that the machine-trained model(s) can be particular to a user, similar users (e.g., users associated with similarity metrics that are within a threshold), a group of users (e.g., a workspace, an organization), a virtual space (e.g., a channel, a direct message, etc.), etc.

In some examples, the machine-trained model(s) can output recommendations with respect to aspect(s) of messages. That is, in at least one example, the feedback component 116 can analyze input associated with a new message using the machine-trained model(s) and, in some examples, can generate recommendations associated with aspect(s) of the new message.

At operation 906, the feedback component 116 can use the machine-trained model to generate recommendations for new messages. In at least one example, the feedback component 116 can utilize the model to generate recommendations regarding aspects of messages for optimization, change, revision, or other modification, as described above. In some examples, an aspect can be a virtual space with which the new message is to be posted, wherein the virtual space comprises a channel, a direct message, or a board. In some examples, an aspect of the new message can comprise a tone or sentiment of the new message. In some examples, an aspect of the new message can comprise an indication whether to include (or not include) an emoji, a reactji, an image, a video, a word, and/or a phrase. In some examples, if an emoji, a reactji, an image, a video, a word, and/or a phrase is recommended, the recommendation can include a particular emoji, reactji, image, video, word, and/or phrase. In some examples, an aspect of the new message can comprise a format, such as a text message, a video message, etc. In some examples, an aspect can comprise a time for posting a message, a date for posting a message, or the like.

The process 900 can be repeated for updating and/or re-training the model. That is, as new messages are sent and received via the communication platform, such new messages can be used as training data for updating and/or re-training the model, as represented by the arrow returning to operation 902. In some examples, this enables the model to become more accurate over time.

In some examples, the same or similar operations can be performed to train different models. For example, the communication platform can train models to output scores or other indicators representative of how well messages comply with particular qualities, such as inclusivity, gender neutrality, political correctness, political neutrality, hyperbole, tone, sentiment, relevance, etc., as described above. In some examples, messages and/or other interactions associated with users of the communication platform, which can be labeled with scores, can be used as training data for the model(s). In some examples, machine-trained model(s) can be trained on subsets of the messages and/or other interactions associated with the users of the communication platform such that the machine-trained model(s) can be particular to a user, similar users (e.g., users associated with similarity metrics that are within a threshold), a group of users (e.g., a workspace, an organization), a virtual space (e.g., a channel, a direct message, etc.), etc. Such model(s) can be used for outputting scores of new messages during composition and/or generating recommendations based thereon, as described above.

FIG. 10 illustrates an example process 1000 for generating a recommendation associated with a new message, as described herein.

At operation 1002, a functional component of a communication platform can receive, via a user interface of a communication platform, a request to generate a new message. In at least one example, a user can interact with the user interface to request to generate a new message. In some examples, such a request can be in association with an input mechanism 222 presented via a user interface 200 of the communication platform. In some examples, such a request can be in association with an actuation of a user interface element 224 which can cause a composition user interface 226 to be presented via the user interface 200. The composition user interface 226 can provide an input mechanism to enable a user to generate a message. In some examples, the composition user interface 226 can be presented via a pop-up, overlay, modal, new section of the user interface 200, a new user interface, and/or the like. As described above, the input mechanism 222 can additionally or alternatively comprise a composition user interface. In some examples, the composition user interface 226 can be configured for text input (e.g., via a keyboard or touchscreen), spoken input (e.g., via a microphone), an audio/visual input (e.g., via a camera), a combination of the foregoing, and/or the like. In some examples, the composition user interface 226 can include a mechanism for attaching or embedding objects and/or references to objects, such as images, files, and/or the like. In some examples, the composition user interface 226 can include a mechanism for associating emojis, reactjis, images, videos, etc. with messages.

As described above, a "message" can refer to any electronically generated digital object, provided by a user using a user computing device associated with the communication platform, that is configured for display within a channel, direct message, and/or other virtual space of the communication platform for facilitating communications as described herein. A message may include any text, image, video, audio, or combination thereof provided by a user (using a user computing device). In some examples, messages can be associated with one or more files or other attachments, emojis, reactjis, and/or the like. In some examples, messages can include or be associated with one or more links to content stored by the communication platform or a third-party platform or service. Each message can include metadata comprising a sending user identifier (e.g., identifying a sender or originator of the message), a recipient identifier (e.g., identifying a user and/or entity that is intended to receive the message), a message identifier (e.g., identifying the message itself), a group identifier (e.g., identifying a group associated with the sender and/or message), a channel identifier (e.g., identifying a channel associated with the message and/or the recipient), a direct message identifier (e.g., identifying a direct message associated with the message and/or the recipient), a virtual space identifier (e.g., identifying a virtual space associated with the message and/or the recipient), and/or the like. In some examples, message metadata can include message content in addition to the one or more identifiers listed above.

At operation 1004, the feedback component 116 can access user data associated with a recipient of the new message. In at least one example, if a recipient is identified, the feedback component 116 can access user data associated with the recipient. In some examples, such user data can be stored in a user profile in the datastore 122. As described above, a user profile can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like. In some examples, a user profile can store indications of user preferences, which can be explicitly indicated or learned. In some examples, a user profile can store data received from third-party platforms, including but not limited to, indications of classifications (e.g., Myers-Briggs®, Clifton-Strengths®, etc.). In some examples, a user profile can store an indication of a classification determined by the communication platform based on its own models or mechanisms. In some examples, a user profile can indicate a role or position of a user, which can be determined based at least in part on an organizational chart and/or learned. In some examples, a user profile can store indications of which users and/or virtual spaces a user communicates with and/or in, a frequency of such communication, topics associated with such communications, reactions and/or feedback associated with such communications and/or the like.

At operation 1006, the feedback component 116 can generate a recommendation associated with the new message. In at least one example, the feedback component 116 can analyze contents of the new message and can generate recommendations based thereon. In some examples, the feedback component 116 can perform natural language processing, text recognition, image recognition, and/or the like to identify objects and/or topics associated with the message. In some examples, the feedback component 116 can generate recommendations based at least in part on such identified objects and/or topics. In some examples, the feedback component 116 can utilize one or more machine-trained models, such as those described above with reference to FIG. 9, for generating recommendations. In some examples, the feedback component 116 can generate recommendations based at least in part on user data, accessed at operation 1004, data associated with a message (e.g., message type, message content, etc.), data associated with a virtual space to which the new message is to be posted (e.g., description, name, members thereof, type, etc.), and/or the like. In some examples, the feedback component 116 may not have access to user data associated with the recipient and as such may generate a recommendation without accessing such data, as illustrated by the arrow from operation 1002 to operation 1006.

In some examples, the machine-trained model(s) can generate recommendations that relate to aspect(s) of messages. That is, in at least one example, the feedback component 116 can analyze input associated with a new message using the machine-trained model(s) and, in some examples, can generate recommendations associated with aspect(s) of the new message. In some examples, the feedback component 116 can generate recommendations regarding aspects of messages for optimization, change, revision, update, etc., as described above. In some examples, an aspect can be a virtual space with which the new message is to be posted, wherein the virtual space comprises a channel, a direct message, or a board. In some examples, an aspect of the new message can comprise a tone or sentiment of the new message. In some examples, an aspect of the new message can comprise an indication whether to include (or not include) an emoji, a reactji, an image, a video, a word, and/or a phrase. In some examples, if an emoji, a reactji, an image, a video, a word, and/or a phrase is recommended, the recommendation can include a particular emoji, reactji, image, video, word, and/or phrase. In some examples, an aspect of the new message can comprise a format, such as a text message, a video message, etc. In some examples, an aspect can comprise a time for posting a message, a date for posting a message, or the like.

In some examples, the feedback component 116 can output a score or other indicator associated with a particular quality. Such qualities can include inclusivity, gender neutrality, political correctness, political neutrality, hyperbole, tone, sentiment, relevance, etc., as described above. In some examples, scores or other indicators can be output in association with recommendations and/or can be used to generate recommendations.

In some examples, the feedback component 116 can generate recommendations that refer to another channel, direct message, board, thread, and/or the like wherein an object or topic referenced in the new message has been referenced or is being referenced elsewhere on the communication platform. Furthermore, in some examples, the feedback component 116 can analyze input received via a composition user interface and can determine that such input is associated with an object or a topic. In some examples, the feedback component 116 can utilize natural language processing, text recognition, image recognition, and/or the like to detect references to objects and/or topics. The feedback component 116 can analyze data associated with the communication platform to identify whether there are other references to the object or the topic. In at least one example, based at least in part on identifying another reference to the object or the topic, the feedback component 116 can generate a recommendation that the user composing the message access the other reference before posting the message.

In some examples, the feedback component 116 can generate recommendations that provide context to a user composing a message. In such examples, such recommendations can be based at least in part on an intended recipient and/or an intended virtual space to which the message is to be posted. In at least one example, the feedback component 116 can utilize context data, which can include messages previously exchanged between users (e.g., of the communication platform or other communication platforms), comments, responses, reactions (e.g., emojis, reactjis, etc.), etc., associated therewith (e.g., with individual messages and/or threaded conversations associated with the messages), documents, and/or the like to generate recommendations as described herein.

At operation 1008, the feedback component 116 can cause a user interface element associated with the recommendation to be presented via the user interface of the communication platform and in association with the new message. In some examples, the feedback component 116 can output recommendations (e.g., user interface elements associated therewith) while the user is composing content of the message. That is, in some examples, the feedback component 116 can output recommendations in real-time. In some examples, recommendations can be presented as in-line annotations. In some examples, recommendations can be presented as pop-ups, overlays, and/or the like. In some examples, recommendations can be presented automatically (e.g., without input from a user) or in response to actuation of actuation mechanisms associated with recommendations. In some examples, the feedback component 116 can output recommendations after a message has been generated but prior to posting the message in a channel, direct message, board, etc., after a message has been posted, or the like. In some examples, such a recommendation can be a modified draft of the message with all recommendations for optimization included. In some examples, such a recommendation can include multiple recommendations in a list or other configuration wherein a user can select which recommendations to implement. In some examples, recommendations can be in real-time in the sense that such recommendations are output within a threshold period of time from when composition of the message started and/or ended. FIGS. 2A-8 illustrate non-limiting examples of user interfaces and/or user interface elements that can present recommendations as described herein.

As described above, in some examples, a user interface element associated with a recommendation can be associated with an action to be performed (e.g., by the feedback component 116). In at least one example, such an action can comprise a removal of, an addition of, or a modification to a word, phrase, emoji, reactji, image, and/or other content of the message. In some examples, the action can comprise retrieval of a resource (e.g., a file or a conversation associated therewith). In at least one example, if the user interface element is associated with an action to be performed (e.g., "yes" at operation 1010), the feedback component 116 can determine whether a request to perform the action has been received, as illustrated at operation 1012. In at least one example, based at least in part on determining that the request has been received (e.g., "yes" at operation 1012), the feedback component 116 can perform the action 1014. That is, the feedback component 116 can remove, add, or modify the word, phrase, emoji, reactji, image, and/or other content of the message associated with the action to be performed. Or, the feedback component 116 can retrieve the resource. In some examples, the action can be performed by the feedback component 116 without receiving a request to perform the action. That is, in some examples, as illustrated by the line from operation 1010 to operation 1014, the feedback component 116 can perform the action automatically.

In at least one example, based at least in part on determining that such a request has not been received (e.g., "no" at operation 1012), the feedback component 116 can refrain from performing the action, as illustrated at operation 1016.

In at least one example, if the user interface element is not associated with an action to be performed (e.g., "no" at operation 1010), the feedback component 116 can determine whether an event has occurred at operation 1018. If an event has not occurred, the process 1000 can return to operation 1008, wherein the user interface element can continue to be presented until an event occurs. If an event has occurred, the feedback component 116 can terminate presentation of the user interface element, as illustrated at operation 1020. An "event," as used herein can correspond to a lapse of time, an indication that the message has been posted, an indication that a user has navigated away from the composition user interface 226, a request to dismiss or otherwise close the user interface element associated with the recommendation, and/or the like.

In some examples, the recommendation may not be associated with an action to be performed by the communication platform and instead can prompt the user to perform an action (e.g., remove, add, or modify content of the message, access another resource, etc.). In such an example, the user can opt to perform an action per the recommendation (or not). In some examples, the user can opt to post the message (having performed an action associated with the recommendation or not). In such examples, the feedback component 116 can terminate presentation of the user interface element. In some examples, the user can navigate to another resource of the communication platform (e.g., if the recommendation indicates another conversation about an object associated with the new message). In such examples, the feedback component 116 can terminate presentation of the user interface element.

While the process 1000 refers to generating a recommendation for a new message, the same or similar techniques can be applicable to a request to edit a message that has already been posted. That is, in some examples, a user can request to edit a message that has already been posted to a virtual space and such a request can cause a composition user interface, like the composition user interface 226, to be presented via the user interface 200. The feedback component 116 can generate and output recommendations as described above for editing a message.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A method, implemented at least in part by one or more servers of a group-based communication platform, the method comprising: receiving, from a first client of a user associated with the group-based communication platform, a request to generate a new message; generating, based at least in part on a determination of a recipient of the new message and communication data associated with at least one of the recipient or the group-based communication platform, a recommendation associated with an aspect of the new message to optimize the new message for the recipient; and causing a user interface element associated with the recommendation to be presented in via a group-based communication user interface of the group-based communication platform in association with the new message.

B. The method of paragraph A, wherein the communication data comprises a corpus of messages exchanged via the group-based communication platform, the method further comprising: training, based at least in part on the corpus of messages, a model to output recommendations for new messages with associated recipients; and generating the recommendation based at least in part on an output of the model.

C. The method of paragraph B, wherein the corpus of messages is associated with at least one of the recipient, a channel with which the recipient is associated, or an organization with which the recipient is associated.

D. The method of any of paragraphs A-C, wherein the communication data comprises one or more prior messages exchanged between the user and another user on a communication platform.

E. The method of any of paragraphs A-D, wherein the recommendation is generated further based at least in part on a characteristic of the recipient.

F. The method of any of paragraphs A-E, further comprising identifying, in association with the new message, a reference to an object or a topic, wherein generating the recommendation is further based at least in part on determining whether at least one of the object or the topic (i) has been referenced by at least one other user of the group-based communication platform or (ii) is being referenced by at least one other user of the group-based communication platform.

G. The method of any of paragraphs A-F, wherein the new message is associated with a virtual space, and wherein the recommendation is generated further based at least in part on data associated with the virtual space.

H. The method of any of paragraphs A-G, wherein the new message is associated with a type, and wherein the recommendation is generated further based at least in part on the type.

I. A system comprising: one or more processors; and one or more non-transitory computer-readable media storing instructions that, when executed by the one or more processors, cause the system to perform operations comprising: receiving, from a first client of a user associated with a group-based communication platform, a request to generate a new message; generating, based at least in part on a determination of a recipient of the new message and communication data associated with at least one of the recipient or the group-based communication platform, a recommendation associated with an aspect of the new message to optimize the new message for the recipient; and causing a user interface element associated with the recommendation to be presented in via a group-based communication user interface of the group-based communication platform in association with the new message.

J. The system of paragraph I, wherein the communication data comprises a corpus of messages exchanged via the group-based communication platform, the operations further comprising: training, based at least in part on the corpus of messages associated with at least one of the recipient, a channel with which the recipient is associated, or an organization with which the recipient is associated, a model to output recommendations for new messages with associated recipients; and generating the recommendation based at least in part on an output of the model.

K. The system of paragraph I or J, wherein the communication data comprises one or more prior messages exchanged between the user and another user on a communication platform.

L. The system of any of paragraphs I-K, wherein the recommendation is generated further based at least in part on a characteristic of the recipient.

M. The system of any of paragraphs I-L, wherein the new message is associated with a virtual space, and wherein the recommendation is generated further based at least in part on data associated with the virtual space.

N. The system of any of paragraphs I-M, wherein the new message is associated with a type, and wherein the recommendation is generated further based at least in part on the type.

O. One or more non-transitory computer-readable media storing instructions that, when executed by the one or more processors, cause the one or more processors to perform operations comprising: receiving, from a first client of a user associated with a group-based communication platform, a request to generate a new message; generating, based at least in part on a determination of a recipient of the new message and communication data associated with at least one of the recipient or the group-based communication platform, a recommendation associated with an aspect of the new message to optimize the new message for the recipient; and causing a user interface element associated with the recommendation to be presented in via a group-based communication user interface of the group-based communication platform in association with the new message.

P. The one or more non-transitory computer-readable media of paragraph O, wherein the communication data comprises a corpus of messages exchanged via the group-based communication platform, the operations further comprising: training, based at least in part on the corpus of messages associated with at least one of the recipient, a channel with which the recipient is associated, or an organization with which the recipient is associated, a model to output recommendations for new messages with associated recipients; and generating the recommendation based at least in part on an output of the model.

Q. The one or more non-transitory computer-readable media of paragraph O or P, wherein the communication data comprises one or more prior messages exchanged between the user and another user on a communication platform.

R. The one or more non-transitory computer-readable media of any of paragraphs O-Q, wherein the recommendation is generated further based at least in part on a characteristic of the recipient.

S. The one or more non-transitory computer-readable media of any of paragraphs O-R, wherein the new message is associated with a virtual space, and wherein the recommendation is generated further based at least in part on data associated with the virtual space.

T. The one or more non-transitory computer-readable media of any of paragraphs O-S, wherein the new message is associated with a type, and wherein the recommendation is generated further based at least in part on the type.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method comprising:
receiving, by one or more servers of a group-based communication platform and from a first client of a user of a plurality of users associated with the group-based communication platform, a first request to generate a new message internal to the group-based communication platform;
determining, by the one or more servers of the group-based communication platform, an intended recipient of the new message;
obtaining, by the one or more servers of the group-based communication platform, a corpus of historical messages exchanged via the group-based communication platform associated with one or more users of the plurality of users, wherein a historical message of the corpus of historical messages is associated with a recipient, a channel with which the recipient is associated, and an organization with which the recipient is associated;
training, by the one or more servers of the group-based communication platform and based at least in part on the corpus of historical messages, a model to output recommendations for new messages;
based at least in part on output of the model and the intended recipient, generating, by the one or more servers of the group-based communication platform, a recommendation associated with an aspect of the new message to optimize the new message for the intended recipient;
causing, by the one or more servers of the group-based communication platform, a user interface element associated with the recommendation to be presented via a group-based communication user interface of the group-based communication platform in association with the new message;
receiving, by the one or more servers of the group-based communication platform, a selection of the user interface element to update the new message to an updated new message in accordance with the recommendation;
receiving, by the one or more servers of the group-based communication platform and from the first client of the user via the group-based communication user interface, a second request to send the updated new message to the intended recipient; and
sending, by the one or more servers of the group-based communication platform and to a second client associated with the intended recipient, the updated new message.

2. The method of claim 1, wherein the corpus of historical messages comprises one or more prior messages exchanged between the user and another user on the group-based communication platform.

3. The method of claim 1, wherein the recommendation is generated further based at least in part on a characteristic of the intended recipient.

4. The method of claim 1, further comprising:
identifying, by the one or more servers of the group-based communication platform and in association with the new message, a reference to an object or a topic, wherein generating the recommendation is further based at least in part on determining whether at least one of the object or the topic has been referenced or is being referenced by at least one other user of the group-based communication platform.

5. The method of claim 1, wherein the new message is associated with a virtual space, and wherein the recommendation is generated further based at least in part on data associated with the virtual space.

6. The method of claim 1, wherein the new message is associated with a type, and wherein the recommendation is generated further based at least in part on the type.

7. A system comprising:
one or more processors; and
one or more non-transitory computer-readable media storing instructions that, when executed by the one or more processors, cause the system to perform operations comprising:
receiving, by one or more servers of a group-based communication platform and from a first client of a user of a plurality of users associated with a group-based communication platform, a request to generate a new message internal to the group-based communication platform;
determining, by the one or more servers of the group-based communication platform, an intended recipient of the new message;
obtaining, by the one or more servers of the group-based communication platform, a corpus of historical messages exchanged via the group-based communication platform associated with one or more users of the plurality of users, wherein a historical message of the corpus of historical messages is associated with a recipient, a channel with which the recipient is associated, and an organization with which the recipient is associated;
training, by the one or more servers of the group-based communication platform and based at least in part on the corpus of historical messages, a model to output recommendations for new messages;
based at least in part on output of the model and the intended recipient, generating, by the one or more servers of the group-based communication platform, a recommendation associated with an aspect of the new message to optimize the new message for the intended recipient;
causing, by the one or more servers of the group-based communication platform, a user interface element associated with the recommendation to be presented via a group-based communication user interface of the group-based communication platform in association with the new message;
receiving, by the one or more servers of the group-based communication platform, a selection of the user interface element to update the new message to an updated new message in accordance with the recommendation;
receiving, by the one or more servers of the group-based communication platform and from the first client of the user via the group-based communication user interface, a second request to send the updated new message to the intended recipient; and
sending, by the one or more servers of the group-based communication platform and to a second client associated with the intended recipient, the updated new message.

8. The system of claim 7, wherein the corpus of historical messages comprises one or more prior messages exchanged between the user and another user on the group-based communication platform.

9. The system of claim 7, wherein the recommendation is generated further based at least in part on a characteristic of the intended recipient.

10. The system of claim 7, wherein the new message is associated with a virtual space, and wherein the recommendation is generated further based at least in part on data associated with the virtual space.

11. The system of claim 7, wherein the new message is associated with a type, and wherein the recommendation is generated further based at least in part on the type.

12. The system of claim 7, the operations further comprising:
identifying, by the one or more servers of the group-based communication platform and in association with the new message, a reference to an object, wherein generating the recommendation is further based at least in part on determining whether the object has been referenced or is being referenced by at least one other user of the group-based communication platform.

13. The system of claim 7, the operations further comprising:
identifying, by the one or more servers of the group-based communication platform and in association with the new message, a reference to a topic, wherein generating the recommendation is further based at least in part on determining whether the topic has been referenced or is being referenced by at least one other user of the group-based communication platform.

14. One or more non-transitory computer-readable media storing instructions that, when executed by one or more processors, cause the one or more processors to perform operations comprising:
receiving, by one or more servers of a group-based communication platform and from a first client of a user of a plurality of users associated with a group-based communication platform, a first request to generate a new message internal to the group-based communication platform;
determining, by the one or more servers of the group-based communication platform, an intended recipient of the new message;
obtaining, by the one or more servers of the group-based communication platform, a corpus of historical messages exchanged via the group-based communication platform associated with one or more users of the plurality of users, wherein a historical message of the corpus of historical messages is associated with a recipient, a channel with which the recipient is associated, and an organization with which the recipient is associated;
training, by the one or more servers of the group-based communication platform and based at least in part on the corpus of historical messages, a model to output recommendations for new messages;
based at least in part on output of the model and the intended recipient, generating, by the one or more servers of the group-based communication platform, a recommendation associated with an aspect of the new message to optimize the new message for the intended recipient;
causing, by the one or more servers of the group-based communication platform, a user interface element associated with the recommendation to be presented via a group-based communication user interface of the group-based communication platform in association with the new message;
receiving, by the one or more servers of the group-based communication platform, a selection of the user interface element to update the new message to an updated new message in accordance with the recommendation;
receiving, by the one or more servers of the group-based communication platform and from the first client of the user via the group-based communication user interface, a second request to send the updated new message to the intended recipient; and
sending, by the one or more servers of the group-based communication platform and to a second client associated with the intended recipient, the updated new message.

15. The one or more non-transitory computer-readable media of claim 14, wherein the corpus of historical messages comprises one or more prior messages exchanged between the user and another user on the group-based communication platform.

16. The one or more non-transitory computer-readable media of claim 14, wherein the recommendation is generated further based at least in part on a characteristic of the intended recipient.

17. The one or more non-transitory computer-readable media of claim 14, wherein the new message is associated with a virtual space, and wherein the recommendation is generated further based at least in part on data associated with the virtual space.

18. The one or more non-transitory computer-readable media of claim 14, wherein the new message is associated with a type, and wherein the recommendation is generated further based at least in part on the type.

19. The one or more non-transitory computer-readable media of claim 14, the operations further comprising:
identifying, by the one or more servers of the group-based communication platform and in association with the new message, a reference to an object or a topic, wherein generating the recommendation is further based at least in part on determining whether at least one of the object or the topic has been referenced or is being referenced by at least one other user of the group-based communication platform.

* * * * *